United States Patent
Allen et al.

(10) Patent No.: US 6,654,045 B2
(45) Date of Patent: *Nov. 25, 2003

(54) TELECONFERENCING METHOD AND SYSTEM

(75) Inventors: David L. Allen, Arcanum, OH (US); Herold Williams, Huber Heights, OH (US)

(73) Assignee: TeleSuite Corporation, Englewood, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/233,363

(22) Filed: Aug. 30, 2002

(65) Prior Publication Data

US 2003/0020805 A1 Jan. 30, 2003

Related U.S. Application Data

(63) Continuation of application No. 09/695,460, filed on Oct. 24, 2000, now Pat. No. 6,445,405, which is a continuation of application No. 09/047,771, filed on Mar. 25, 1998, now Pat. No. 6,160,573, which is a continuation of application No. 08/740,839, filed on Nov. 4, 1996, now Pat. No. 5,751,337, which is a continuation of application No. 08/308,603, filed on Sep. 19, 1994, now Pat. No. 5,572,248.

(51) Int. Cl.$^7$ .................................................. H04N 7/14
(52) U.S. Cl. .............................. 348/14.08; 348/14.12; 348/14.13; 348/452; 348/552; 348/584; 379/202.01
(58) Field of Search ................ 348/14.01–14.16, 348/211, 222, 399, 401, 402, 409, 439, 448, 415, 451, 452, 458, 459, 552, 578, 581, 584–586, 591, 592, 598, 606, 632, 911; 379/93.01, 93.17, 93.21–93.24, 93.37, 202.01

(56) References Cited

U.S. PATENT DOCUMENTS

| | | | |
|---|---|---|---|
| 4,004,084 A | 1/1977 | Brown et al. | |
| 4,400,724 A | 8/1983 | Fields | |

(List continued on next page.)

FOREIGN PATENT DOCUMENTS

| | | |
|---|---|---|
| JP | 52-50611 | 4/1977 |
| JP | 63-142986 | 6/1988 |
| JP | 5-22722 | 1/1993 |
| JP | 5-068246 | 3/1993 |

OTHER PUBLICATIONS

Gordon Heffron, "Teleconferencing comes of age," IEEE Spectrum, pp. 61–66, Oct. 1984.

(List continued on next page.)

*Primary Examiner*—Wing Fu Chan
(74) *Attorney, Agent, or Firm*—Jacox, Meckstroth & Jenkins

(57) ABSTRACT

A method and system provides a face-to-face video conference. The method and apparatus comprise a conferencing system consisting of a conferencing station defining a predetermined motif, an image system for generating a substantially full scale image of a person at the conferencing station so that participants at the conferencing station feel that any images of persons displayed by the imager at the conferencing station are present and face-to-face. The method comprises the steps of receiving image data at a teleconferencing station, the image data including data corresponding to at least one person, and displaying an image corresponding to the image data at the teleconferencing station so that at least one participant at the teleconferencing station views an image of said at least one person, thereby providing a face-to-face presence environment whereat the image of at least one person appears substantially life size. The teleconferencing method may further include the steps of generating image data corresponding to an image, transmitting at least a portion of the image data corresponding to at least a portion of the image to a teleconferencing station and displaying the portion of the image data at the teleconferencing station during a teleconference.

50 Claims, 13 Drawing Sheets

U.S. PATENT DOCUMENTS

Figure 2:
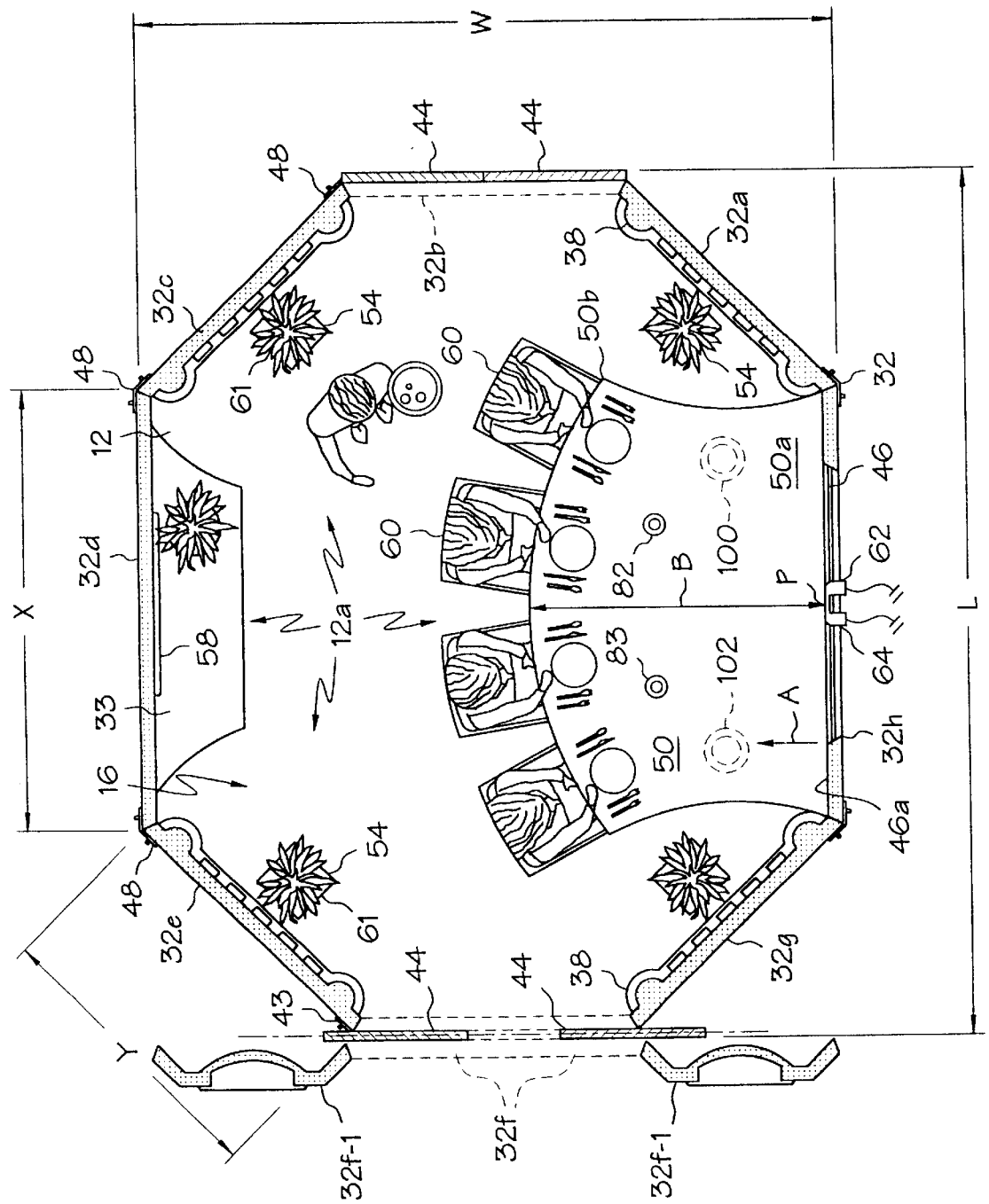

| | | | |
|---|---|---|---|
| 4,546,383 A | 10/1985 | Abramatic et al. | |
| 4,650,929 A | 3/1987 | Boerger et al. | |
| 4,703,348 A | 10/1987 | Yuasa et al. | |
| 4,707,077 A | 11/1987 | Marom | |
| 4,758,887 A | 7/1988 | Engle et al. | |
| 4,800,432 A | 1/1989 | Barnett et al. | |
| 4,823,194 A | 4/1989 | Mishima et al. | |
| 4,890,314 A | 12/1989 | Judd et al. | |
| 4,928,301 A | 5/1990 | Smoot | |
| 4,931,872 A | 6/1990 | Stoddard et al. | |
| 4,942,470 A | 7/1990 | Nishitani et al. | |
| 4,965,666 A | 10/1990 | Haghiri | |
| 4,965,819 A | 10/1990 | Kannes | |
| 4,991,009 A | 2/1991 | Suzuki et al. | |
| 4,996,592 A | 2/1991 | Yoshida | |
| 5,014,267 A | 5/1991 | Tompkins et al. | |
| 5,031,620 A | 7/1991 | Oe | |
| 5,032,901 A | 7/1991 | Vlahos | |
| 5,038,224 A | 8/1991 | Martulli et al. | |
| 5,055,927 A | 10/1991 | Keesen et al. | |
| 5,079,627 A | 1/1992 | Filo | |
| 5,117,285 A | 5/1992 | Nelson et al. | |
| 5,122,865 A | 6/1992 | Choi | |
| 5,127,078 A | 6/1992 | Terry et al. | |
| 5,153,720 A | 10/1992 | Kawai | |
| 5,157,491 A * | 10/1992 | Kassatly | 348/14.08 |
| 5,159,451 A | 10/1992 | Faroudja et al. | |
| 5,168,528 A | 12/1992 | Field, Jr. | |
| 5,173,772 A | 12/1992 | Choi | |
| 5,187,571 A | 2/1993 | Braun et al. | |
| 5,214,512 A | 5/1993 | Freeman | |
| 5,249,039 A | 9/1993 | Chaplin | |
| 5,257,306 A | 10/1993 | Watanabe | |
| 5,261,735 A | 11/1993 | Cohen et al. | |
| 5,272,526 A | 12/1993 | Yoneta et al. | |
| 5,280,540 A | 1/1994 | Addeo et al. | |
| 5,282,027 A | 1/1994 | Tanigaki et al. | |
| 5,315,633 A | 5/1994 | Champa | |
| 5,347,306 A | 9/1994 | Nitta | |
| 5,394,198 A | 2/1995 | Janow | |
| 5,397,133 A | 3/1995 | Penzias | |
| 5,400,069 A | 3/1995 | Braun et al. | |
| 5,438,357 A | 8/1995 | McNelley | |
| 5,508,743 A | 4/1996 | Iizuka | |
| 5,541,640 A | 7/1996 | Larson | |
| 5,572,248 A * | 11/1996 | Allen et al. | 348/14.08 |
| 5,689,641 A | 11/1997 | Ludwig et al. | |
| 5,691,777 A * | 11/1997 | Kassatly | |
| 5,751,337 A * | 5/1998 | Allen et al. | 348/14.08 |
| 5,850,250 A | 12/1998 | Konopka et al. | |
| 6,160,573 A * | 12/2000 | Allen et al. | 348/14.08 |
| 6,445,405 B1 * | 9/2002 | Allen et al. | 348/14.08 |

OTHER PUBLICATIONS

E. F. Brown et al., "A Continuous Presence Video Conferencing System," IEEE 1978 National Telecommunications Conference, Birmingham, AL, pp. 34.1.1–34.1.4, Dec. 3–6.

* cited by examiner

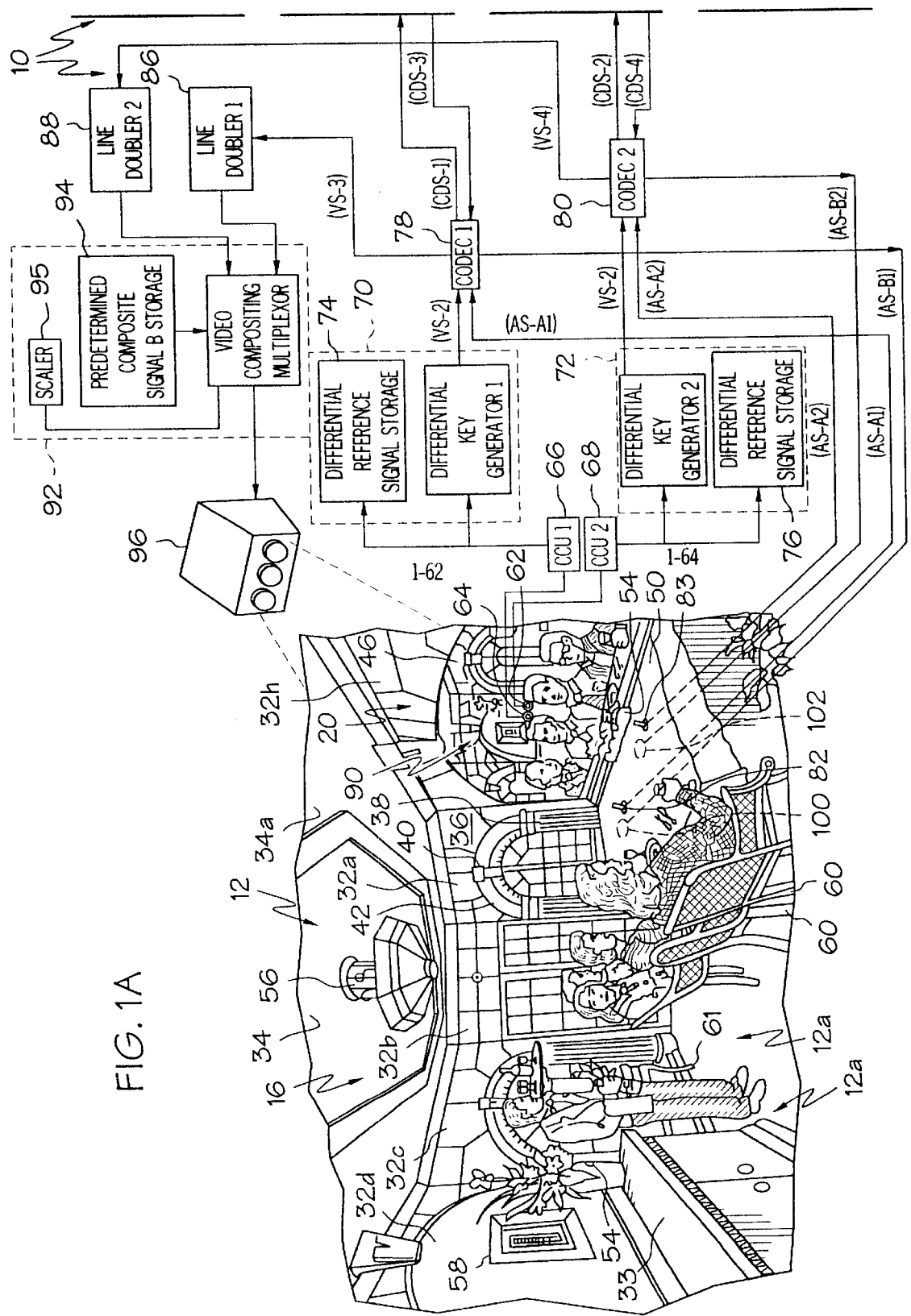

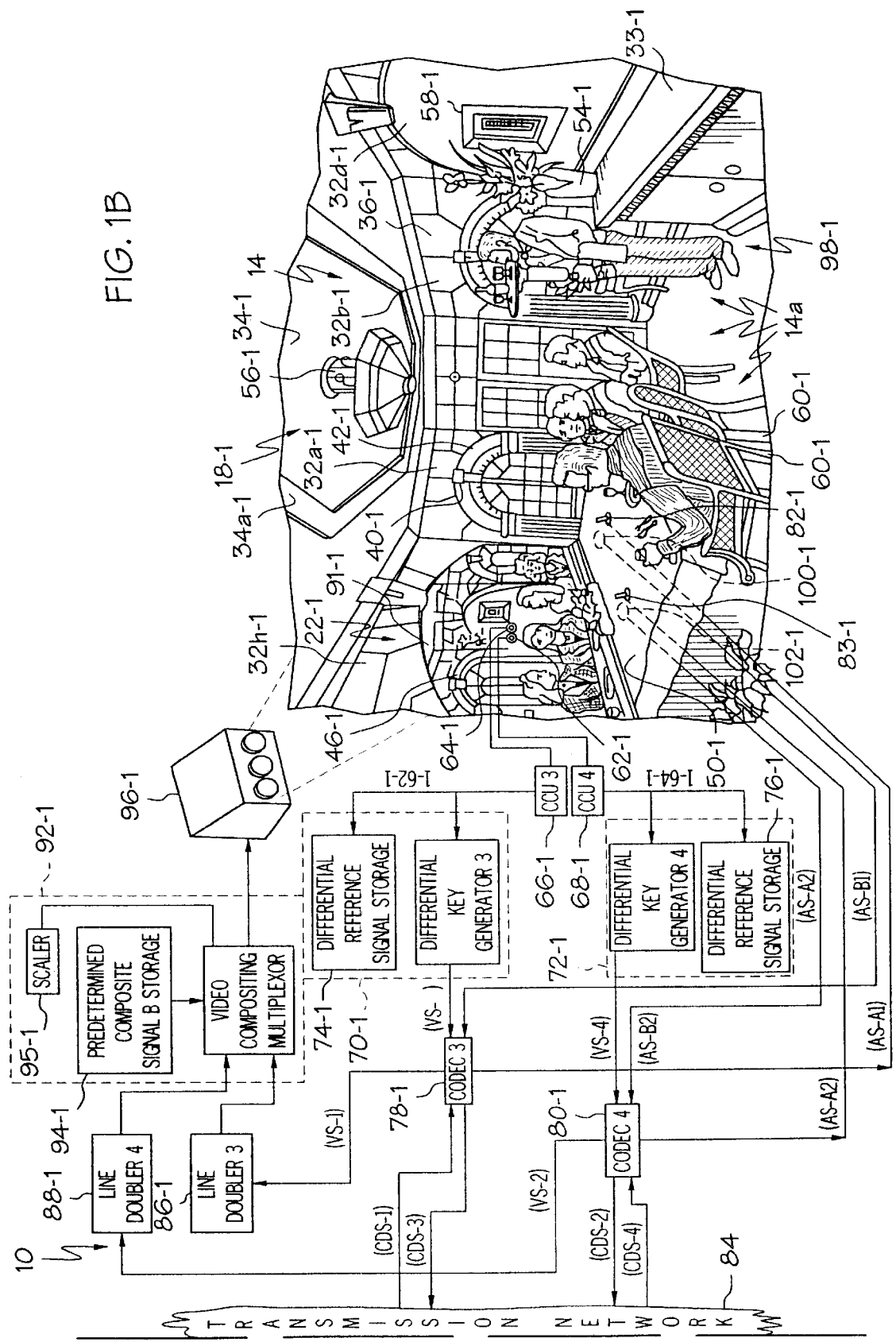

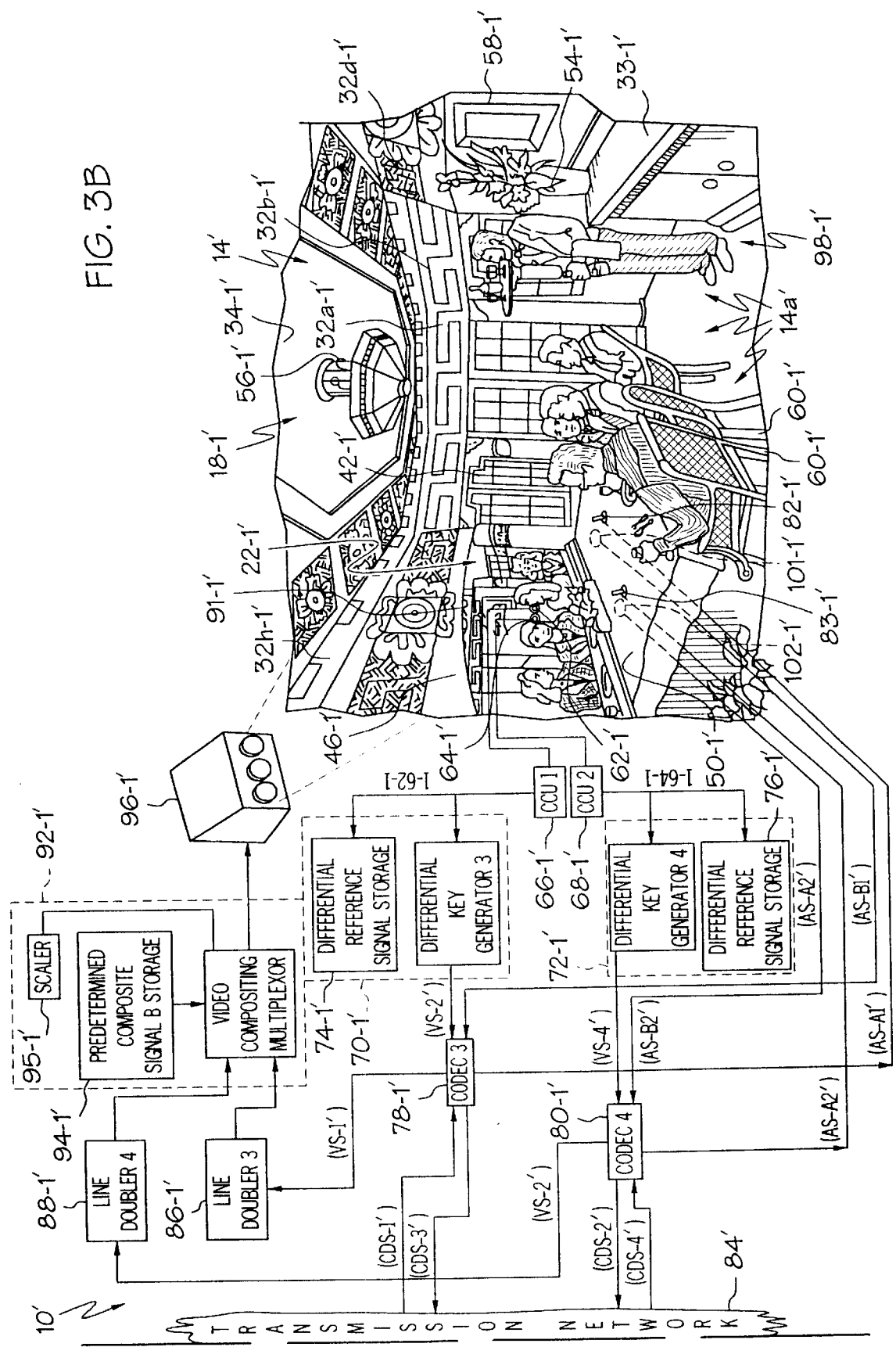

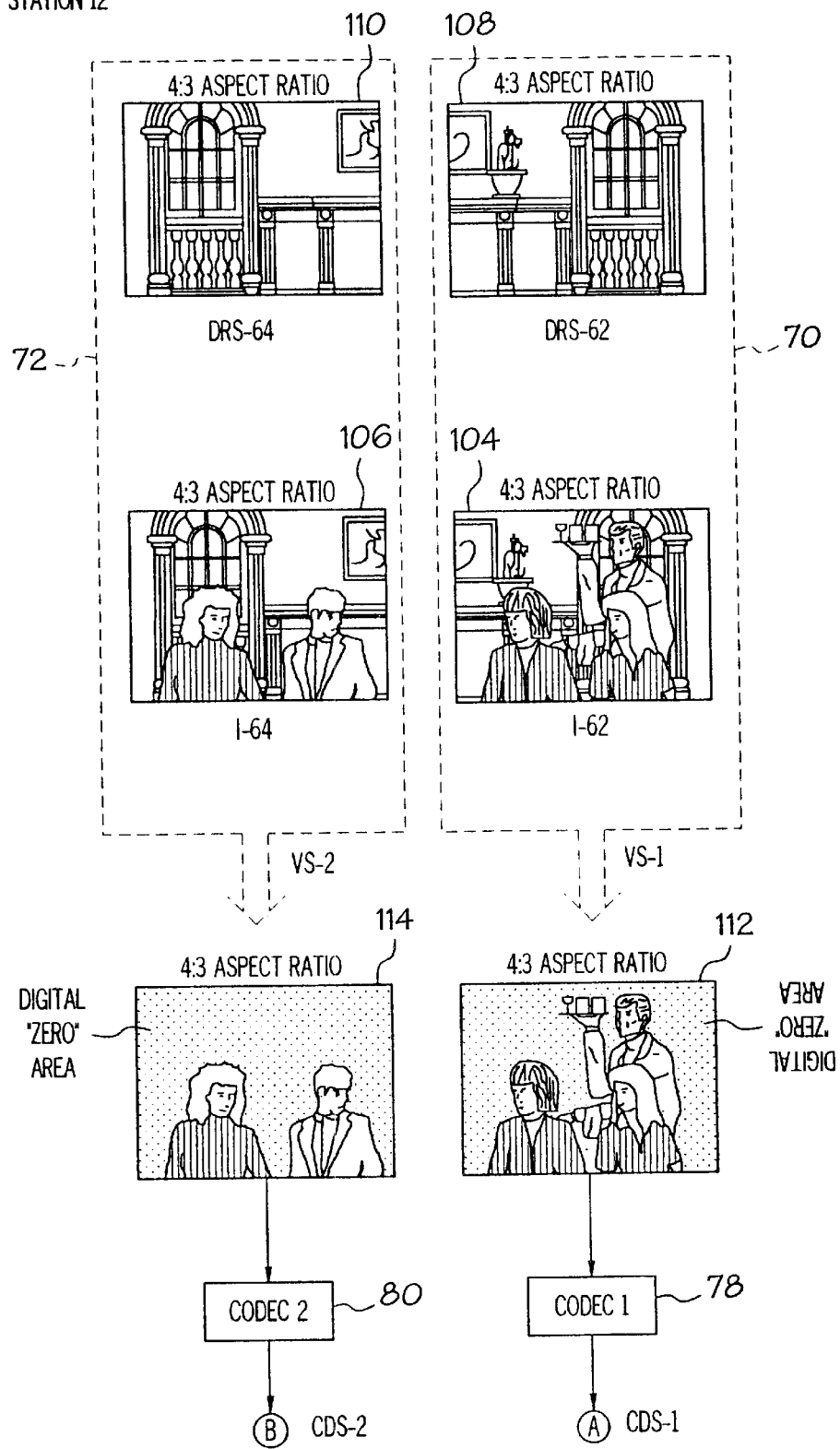

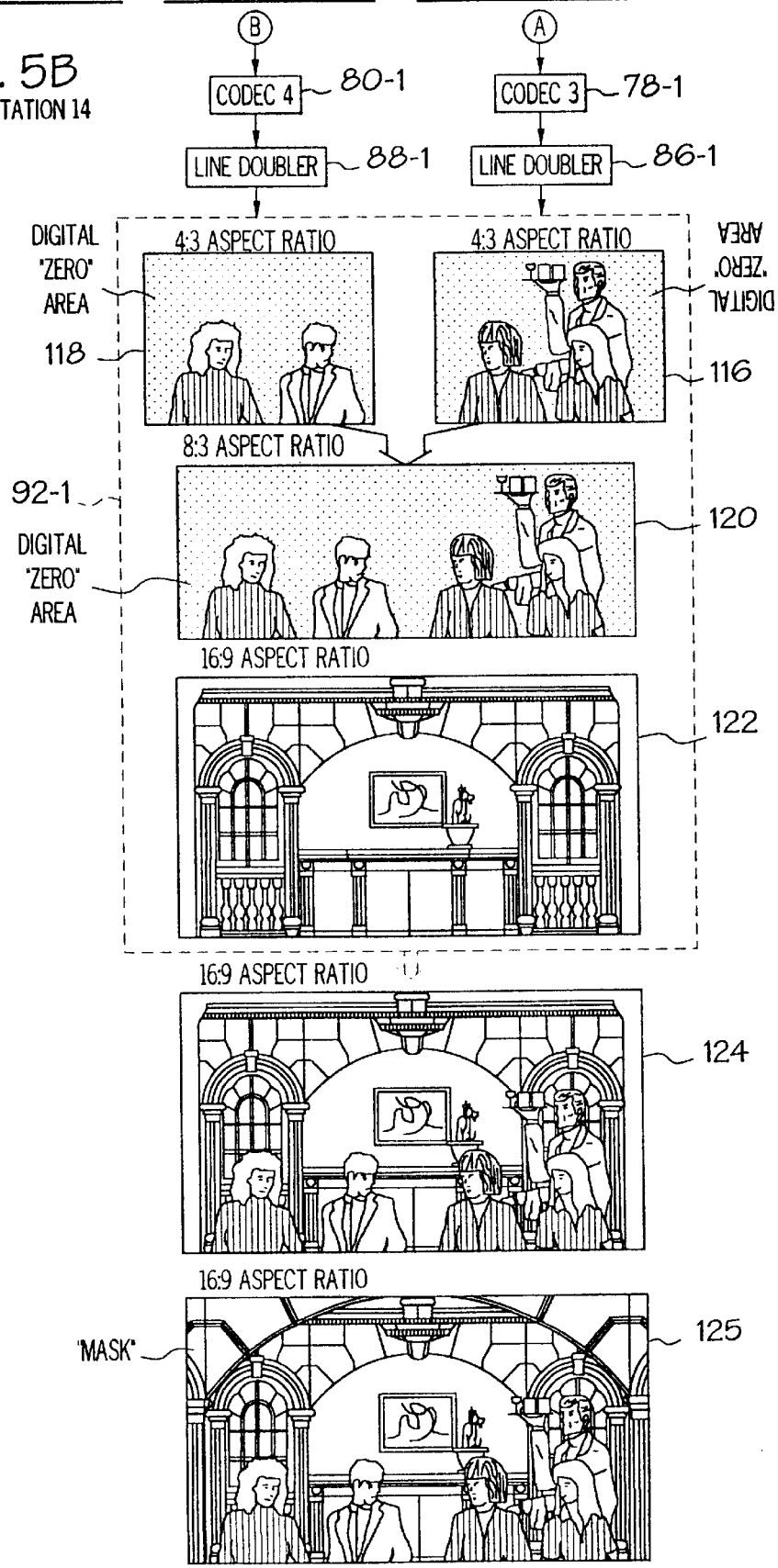

TELECONFERENCING METHOD AND SYSTEM

RELATED APPLICATIONS

This application is a continuation of application Ser. No. 09/695,460 filed Oct. 24, 2000, now U.S. Pat. No. 6,445,405 issued Sep. 3, 2002, which is a continuation of application Ser. No. 09/047,771 filed Mar. 25, 1998, now U.S. Pat. No. 6,160,573, which is a continuation of Ser. No. 08/740,839 filed Nov. 4, 1996, now U.S. Pat. No. 5,751,337, which is a continuation of Ser. No. 08/308,603 filed Sep. 19, 1994, issued as U.S. Pat. No. 5,572,248.

BACKGROUND OF THE INVENTION

The present invention is related to a video conferencing system and method and, more particularly, to a teleconferencing system which is capable of producing a "video mirror" at a station such that any participants at one or more remote stations may be imaged and displayed in the video mirror at the station so that they appear to be present or face-to-face with any participants at the station.

Visual telephone systems presently provide communication between at least two locations for allowing a video conference among participants situated at each station. An objective in some video conferencing arrangements is to provide a plurality of television cameras at one location. The outputs of those cameras are transmitted along with audio signals to a corresponding plurality of television monitors at a second location such that the participants at the first location are perceived to be present or face-to-face with participants at the second location. In achieving good face-to-face presence, the number of conferees included in the video picture from each camera is normally limited to a few people, typically one to four. There are usually a like number of monitors at the receiving station, each strategically focused, aligned and positioned so that their displays appear contiguous, seamless and properly aligned. The apparatuses and methods employed heretofore to achieve proper positioning, focus and alignment have been complex and costly.

Further, the images captured by the plurality of cameras must be arranged and displayed so that they generate a non-overlapping and/or contiguous field of view, for example, as described in U.S. Pat. No. 4,890,314 which issued to Judd et al. on Dec. 26, 1989 and which is hereby incorporated by reference and made a part hereof.

The prior art systems have also been deficient because they have failed to provide means for generating an image, such as an image of a plurality of participants, at one station, differentiating the image to provide a differentiated image and subsequently compositing the differentiated image with a predetermined composite image to provide a composited image which complements or becomes visually complementary, contiguous or integrated with the remote station when the image is displayed at the remote station.

Another problem with prior art video conferencing systems is eye contact among participants at the stations. Typically, a camera is placed somewhere above the display monitor at which a participant is observing a display of the participant from the remote station. Consequently, the camera captures the participant at an angle above the participants viewing level or head. Thus, when an image of that participant is displayed at the remote station, it appears as if the participant is looking down (e.g., towards the ground). Previous solutions to this problem have required complex optical systems and methods using, for example, a plurality of lenses and mirrors. The solutions have usually been designed for use when the camera is capturing an image of a single participant, and they fall short when simultaneously capturing images of multiple participants.

The prior art stations themselves were not architecturally designed in a modular form so that they could be easily assembled, decorated and combined with a video image or sub-image from the remote station in a manner which would enhance the virtual presence environment.

SUMMARY OF THE INVENTION

It is, therefore, a primary object of the present invention to provide a face-to-face teleconferencing system which enables a plurality of participants at a plurality of stations to teleconference such that the participants generally appear face-to-face with one or more participants at remote stations in the teleconferencing system.

Another object of this invention is to provide a differentiator or differentiating means which facilitates differentiating at least one image captured at a station into a differentiated image which will ultimately be transmitted to at least one remote station.

Another object of this invention is to provide a method and system for compositing an image or sub-image received from a remote station with a predetermined composite image to provide a composited image, at least a portion of which is displayed at the station.

Still another object of the invention is to provide a system or method which provides a display having wide aspect ratio while utilizing cameras which generate images having smaller aspect ratios.

Still another object of the invention is to provide a method and system for defining a predetermined sensory setting at one or more stations in order to enhance the virtual presence environment at that station.

Still another object of the present invention is to provide a method and apparatus for imaging subjects at one station, processing such images, and displaying such images at a remote station such that such images complement and/or become visually integrated with the remote station.

Another object of this invention is to provide a method and apparatus which is capable of generating a composite image having a plurality of different resolutions.

Still another object of the present invention is to provide a "video mirror" at a station.

Yet another object of the invention is to provide an imaging system which provides a simplified means capturing substantially eye level images of participants at stations while also providing means for simultaneously displaying images at such stations.

Still another object of this invention is to provide a system and method for compositing a plurality of signals corresponding to a plurality of images from at least one station to provide a contiguous or seamless composite image.

Still another object is to provide a method and system for providing a plurality of teleconferencing stations that have complementary predetermined sensory settings which facilitate creating a face-to-face environment when images of such settings and participants are displayed at remote stations.

Another object of the invention is to provide a method and apparatus for generating a video mirror such that an image having a predetermined sensory setting of participants or subjects captured at one station may be displayed at a remote station having a different predetermined sensory setting, yet the remote participants will appear face-to-face in the same predetermined setting as the participants or subjects at the one station.

In one aspect, this invention comprises a teleconferencing method consisting of the steps of receiving image data at a teleconferencing station, the image data including data corresponding to at least one person and displaying an image corresponding to the image data at the teleconferencing station so that at least one participant at the teleconferencing station views said image of at least one person, thereby providing a face-to-face presence environment whereat the image of at least one person appears substantially life size.

In another aspect, this invention comprises a teleconferencing method consisting of the steps of generating image data corresponding to an image, transmitting at least a portion of the image data corresponding to at least a portion of the image to a teleconferencing station and displaying a portion of the image data at the teleconferencing station during a teleconference.

In yet another aspect, this invention comprises a conferencing system consisting of a conferencing station defining a predetermined motif, an image system for generating a substantially full scale image of a person at the conferencing station so that participants at the conferencing station feel that any images of persons displayed by the imager at the conferencing station are present and face-to-face.

In another aspect, this invention comprises a conferencing system comprising a first station comprising a first sensory area defining a first aura, a second station comprising a second sensory area defining a second aura, and an image system for generating a first station image of at least a portion of the first sensory area and also for displaying a composite image corresponding to the first station image at the second station such that the first and second auras become visually combined to provide an integrated face-to-face environment at the second station.

In another aspect, this invention comprises an image system for use in a conference environment comprising a station having a first conference area and a remote station having a remote video area, the image system comprising a compositor for compositing a first signal which generally corresponds to a video image of a portion of the first conference area with a composite reference signal to provide a composite image signal; and a display for displaying the composited image signal at the remote video area such that the first and second stations appear complementarily integrated.

In still another aspect, of the invention, this invention comprises a teleconferencing system comprising a sensory setting, a second station having a second predetermined sensory setting; and an imaging system for capturing an image at the first station and displaying at least a portion of the image at the second station such that it becomes generally visually integrated with the second predetermined sensory setting.

In another aspect of this invention, this invention comprises a station for use in a teleconferencing environment comprising a first station predetermined setting, first image sensing means associated with the first station predetermined setting for capturing images at the station for transmission to a remote station, audio means for transmitting and/or receiving audio signals from at least one remote station, and display means for displaying an image including at least one sub-image transmitted to the station from the remote station so that the image becomes integrated with the first station predetermined setting to facilitate providing a face-to-face presence teleconference.

In still another aspect of the invention, this invention comprises a method for providing a virtual presence conference in a teleconferencing system having a first station and a second station comprising the step of displaying an image formed from at least one sub-image from the first station at a predetermined location in the second station such that the image becomes visually integrated with the second station to define a single predetermined aura at the second station.

In yet another aspect of the invention, this invention comprises a method for teleconferencing comprising the steps of teleconnecting a first station having a first setting to a second station having a second setting; and displaying a composite image including an image of at least a portion of the first station at the second station such that when the composite image is displayed at the second station it cooperates with the second setting to facilitate providing a face-to-face environment at the second station.

In still another aspect, this invention comprises a method for teleconferencing comprising generating at least one first station signal generally corresponding to a first station image of the first station, comparing the at least one first station signal to a differential reference signal corresponding to a first reference image and generating at least one differential signal comprising a portion of the first station image in response thereto, compositing the at least one differential signal with a predetermined composite signal corresponding to a predetermined image to provide at least one composite image, and displaying the at least one composite image corresponding to the composite signal at a second station.

In yet another aspect, this invention comprises a method for generating a seamless image at a station from a plurality of sub-images at least one of which is received from a remote station comprising the steps of generating the plurality of sub-images, and combining the plurality of sub-images with a predetermined composite image to provide the seamless image.

These advantages and objects, and others, may be more readily understood in connection with the following specification, claims and drawings.

BRIEF DESCRIPTION OF THE ACCOMPANYING DRAWINGS

Figure 3A:
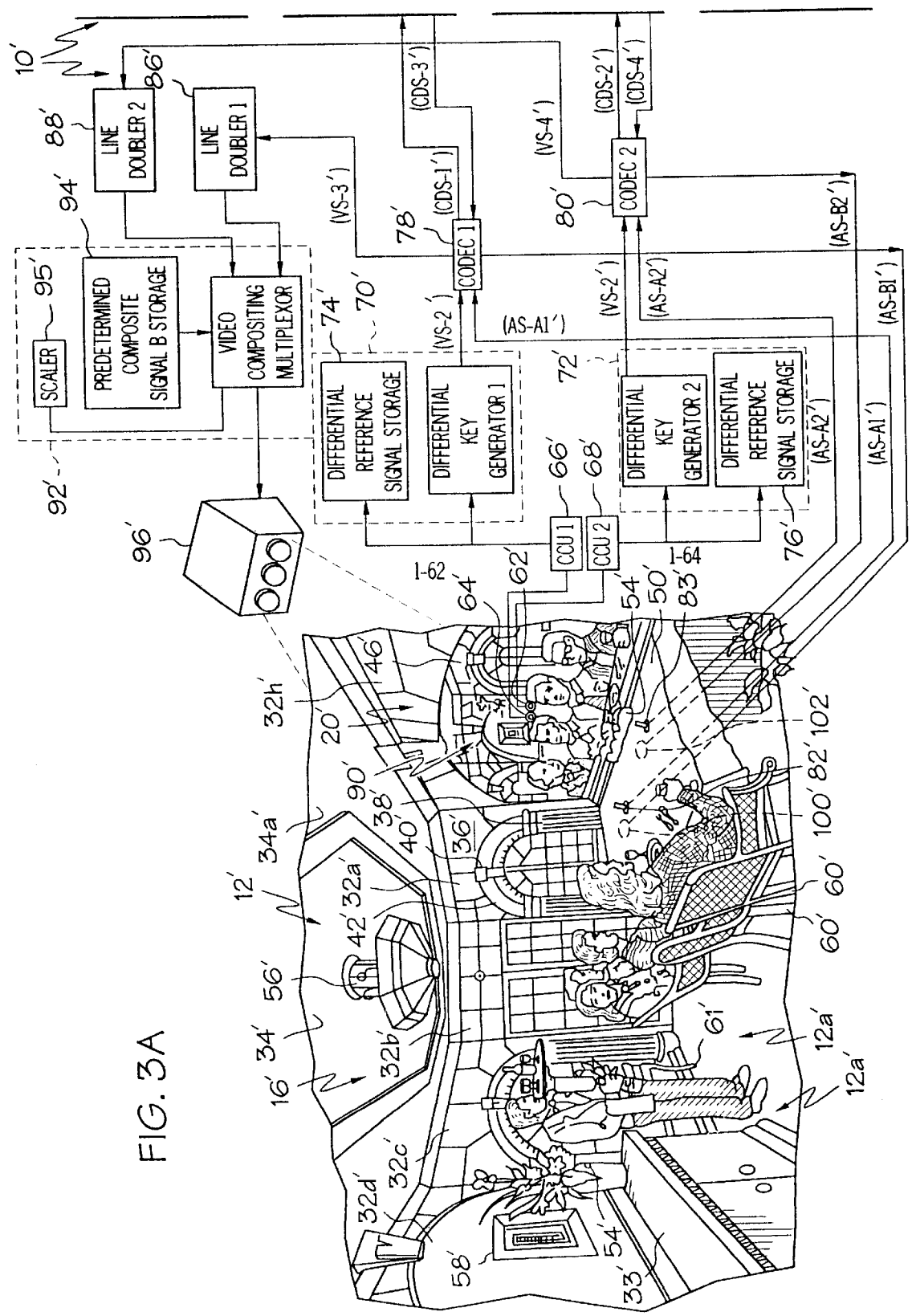
Figure 4A:
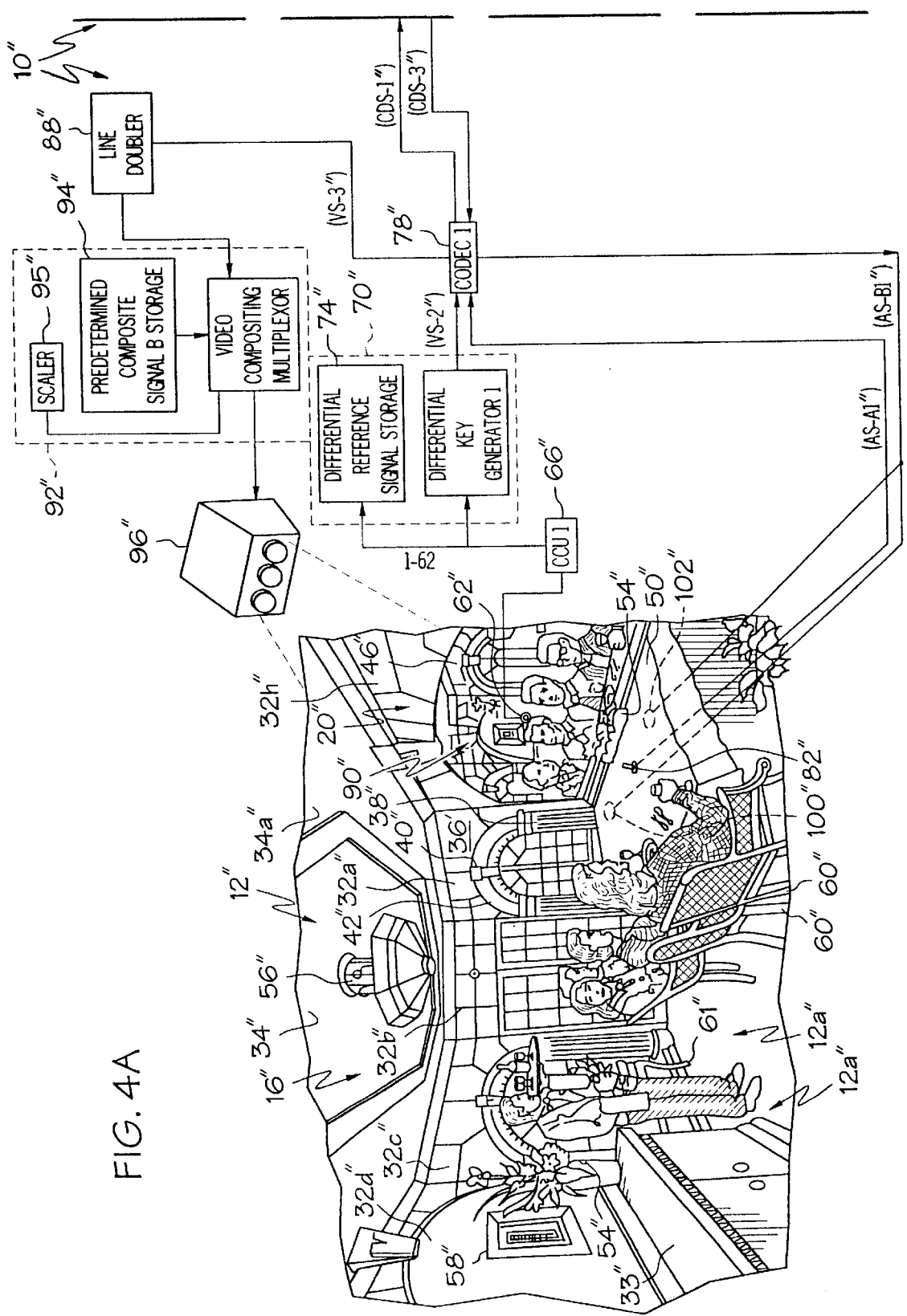
Figure 4B:
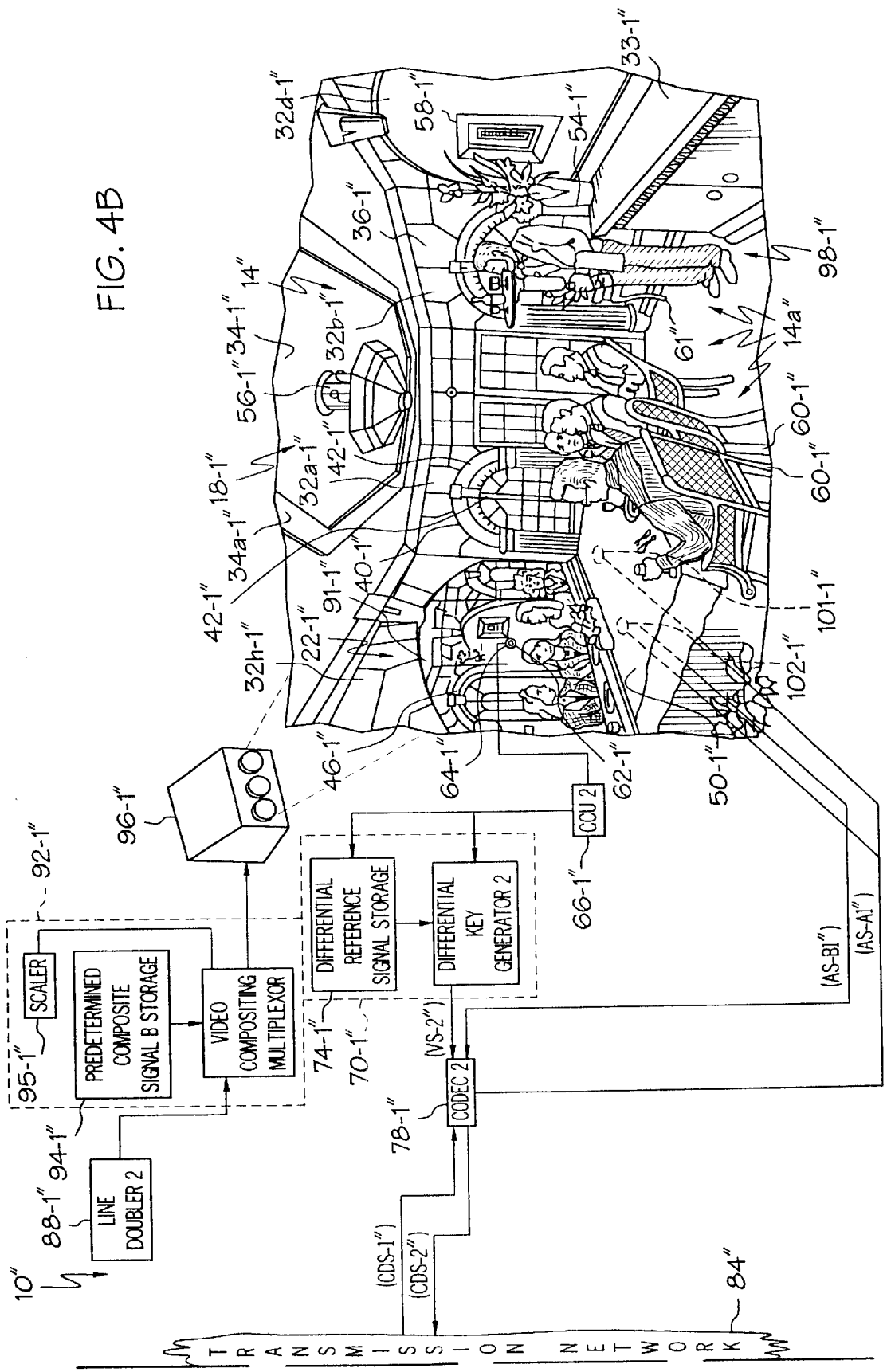
Figure 6A:
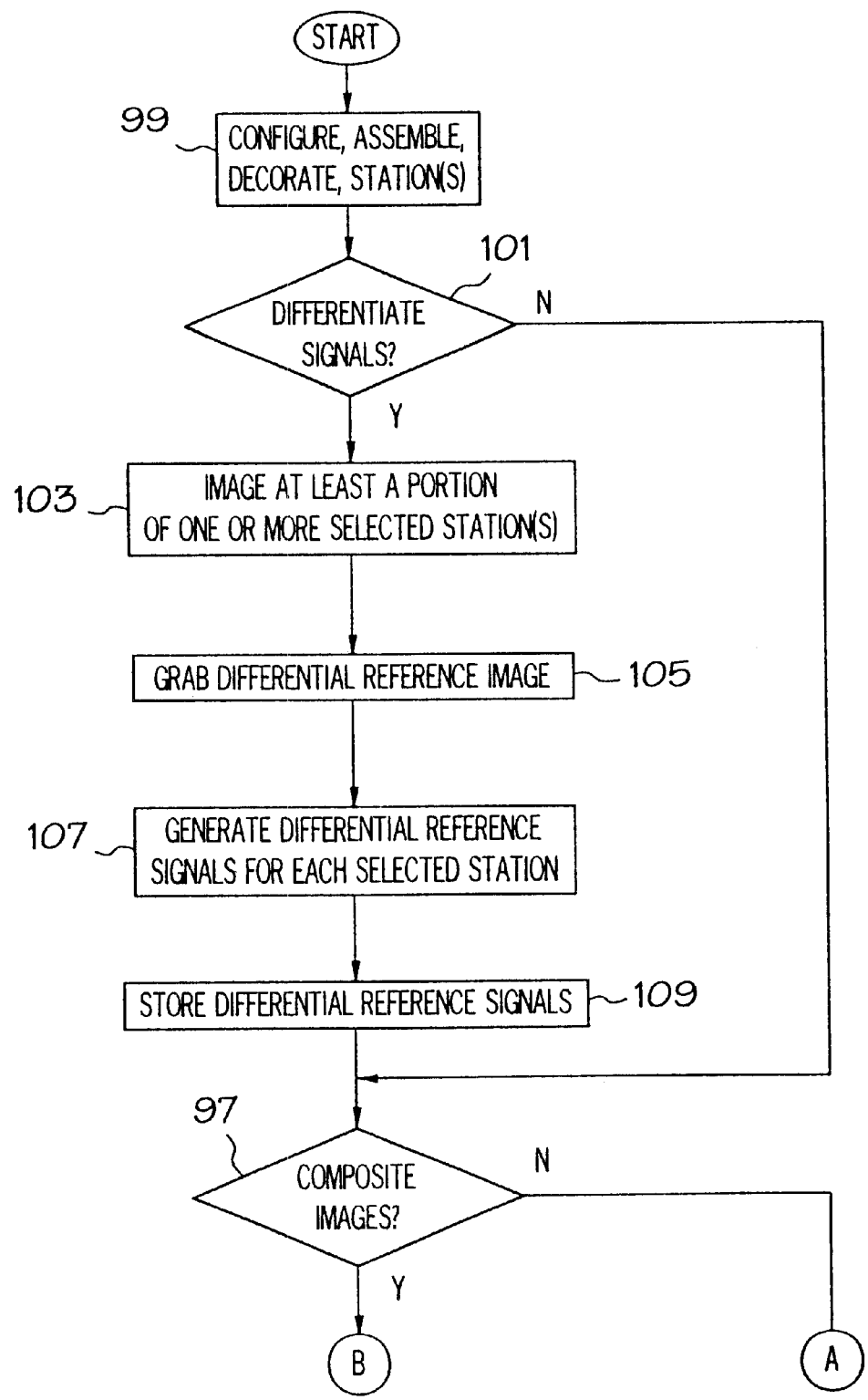
Figure 6B:
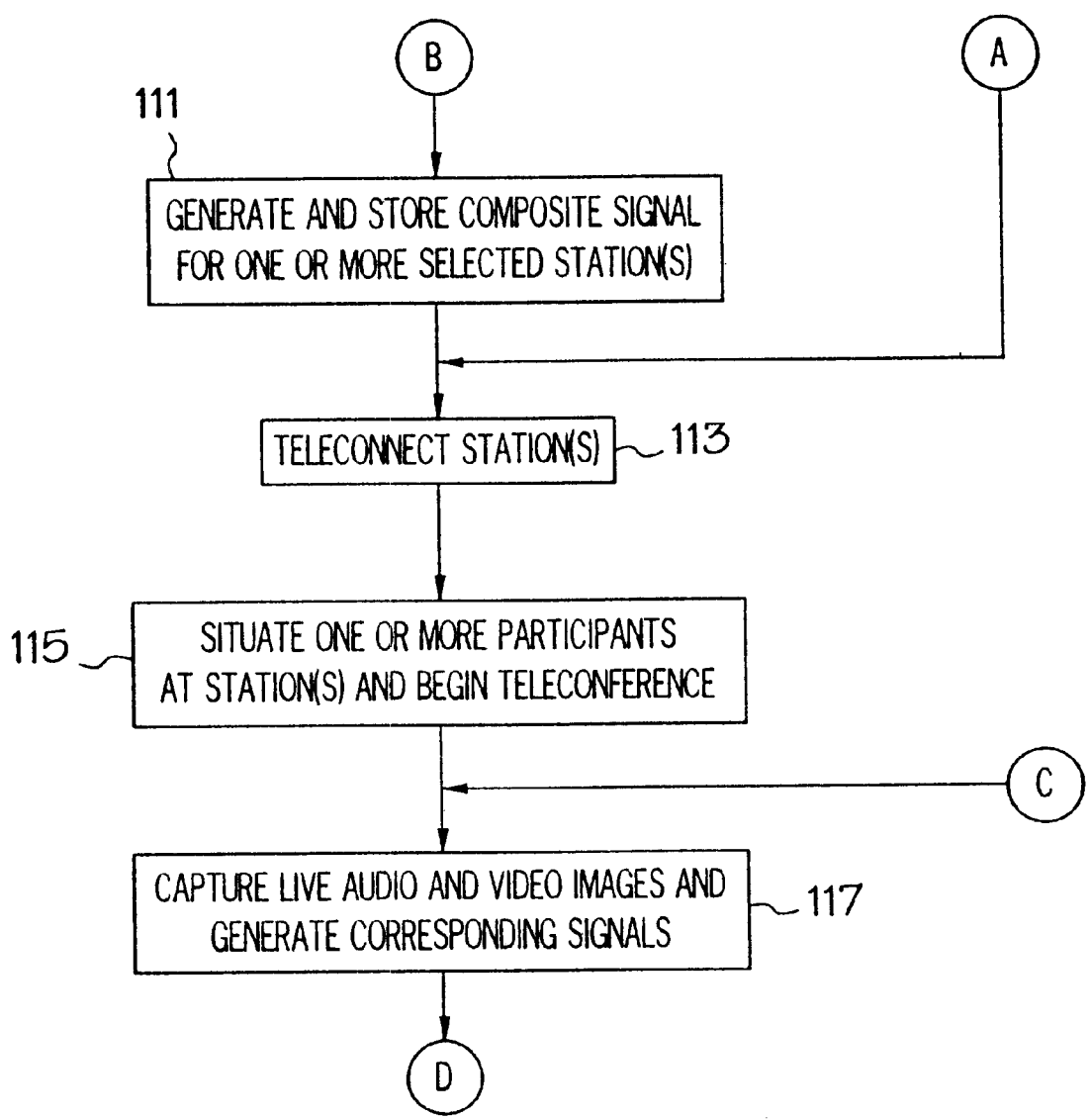
Figure 6C:
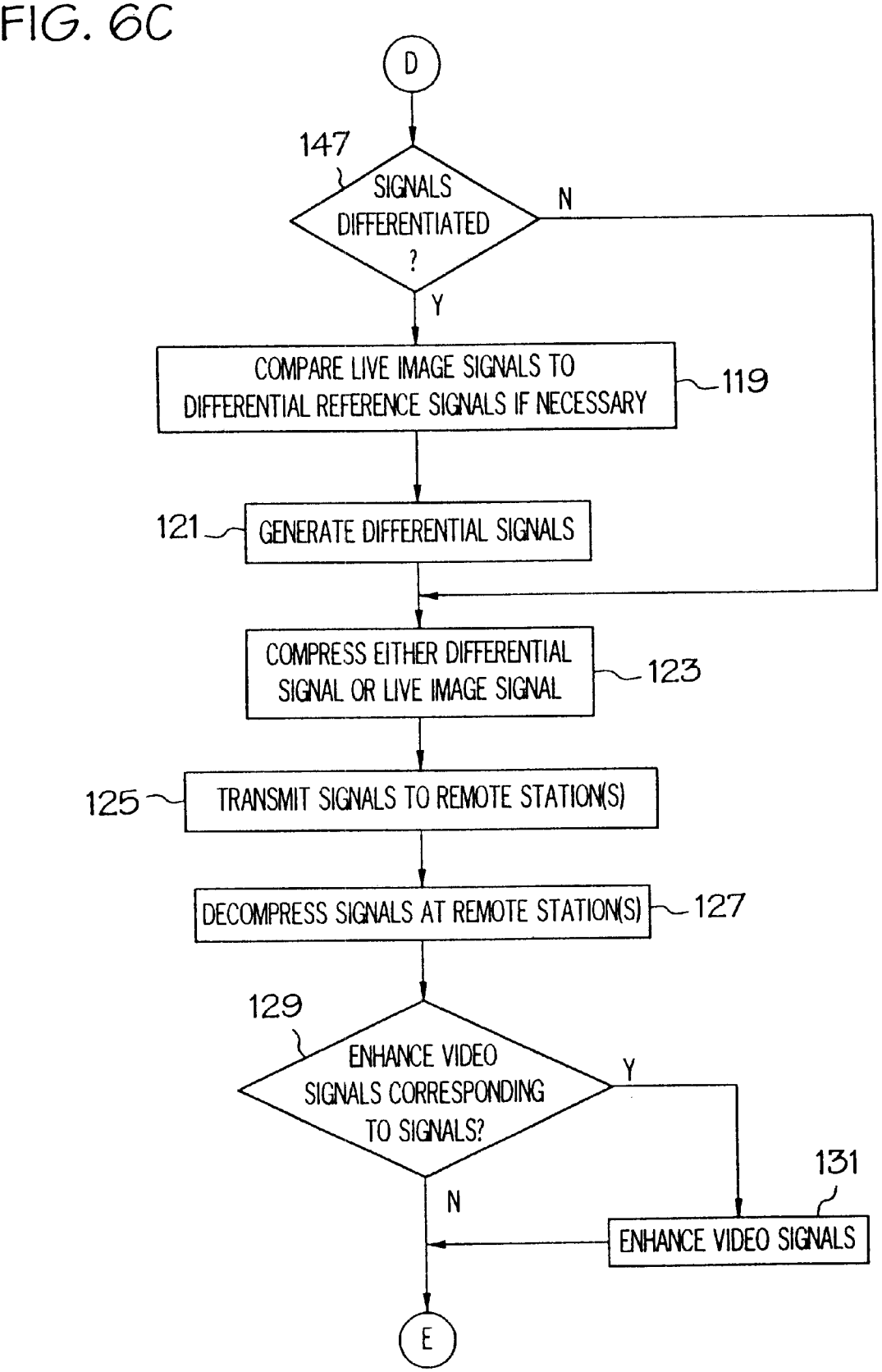
Figure 6D:
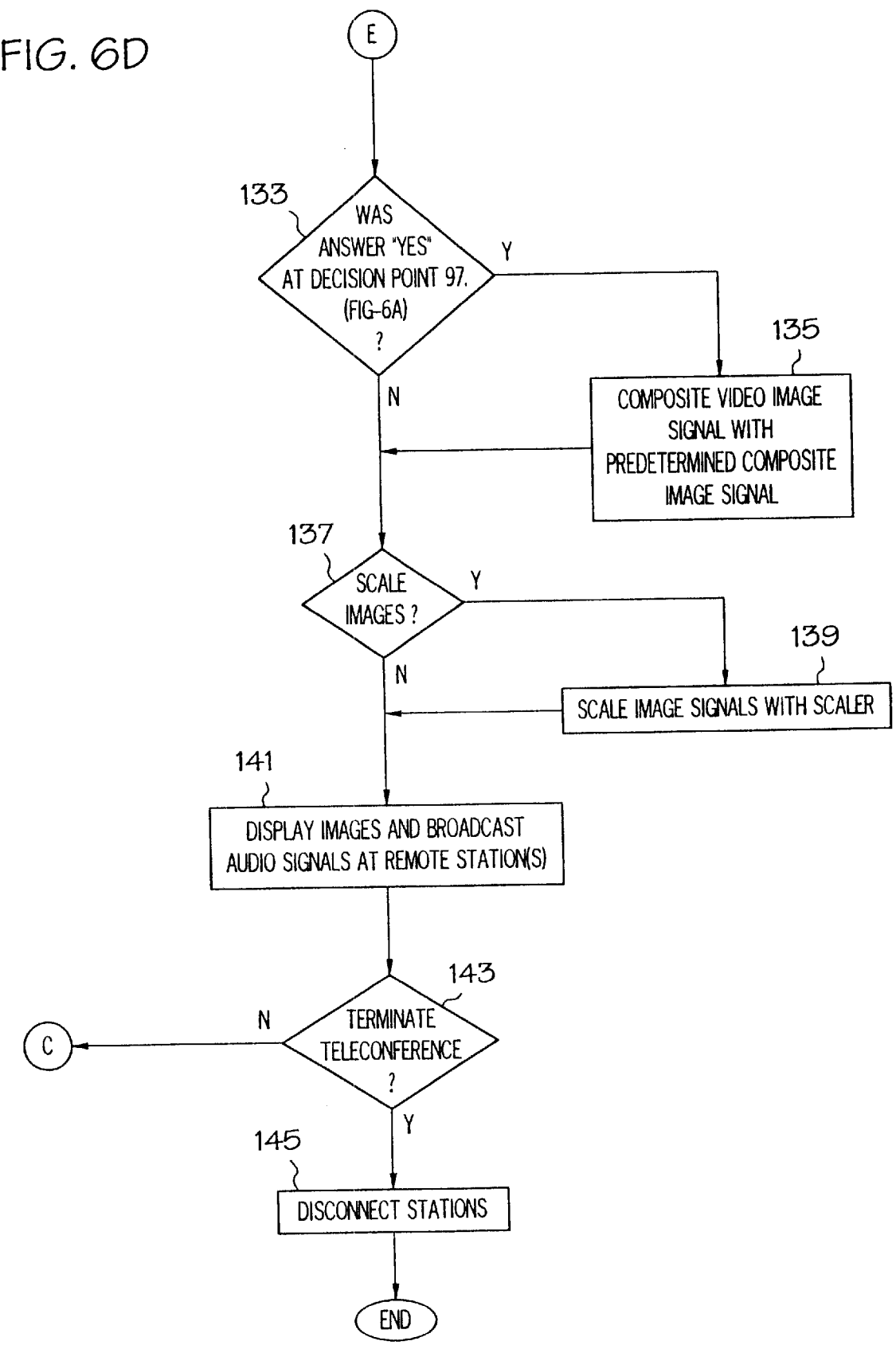

FIGS. 1A and 1B, taken together, show a teleconferencing system according to one embodiment of this invention;

FIG. 2 is a partly broken away top view of a first station of the teleconferencing system shown in FIG. 1A;

FIGS. 3A and 3B, taken together, show another embodiment of the present invention wherein the stations have different predetermined sensory settings;

FIGS. 4A and 4B, taken together, show still another embodiment of the invention having stations which have predetermined sensory settings which are designed, decorated and defined to be complementary and/or substantially identical;

FIGS. 5A and 5B, taken together, provide a visual illustration of the images corresponding to some of the signals generated by the teleconferencing system; and FIGS. 6A–6D, taken together, show a schematic diagram of a method according to an embodiment of this invention.

DETAILED DESCRIPTION OF PREFERRED EMBODIMENT

Referring now to FIGS. 1A and 1B, a teleconferencing system 10 is shown having a first station or suite 12 and a second station or suite 14. The first station 12 comprises a first conference or sensory area 16, and the second station 14 comprises a second conference or sensory area 18-1, respectively. The first and second stations 12 and 14 also comprise a first video area 20 and a second video area 22-1, respectively, associated with the first and second conference areas 16 and 18-1. The first video area 20 is generally integral with a wall 32h in the first station 12. Likewise, the second video area 22-1 is generally integral with a wall 32h-1 in the second station 14. In the embodiment being described, the first and second stations are geographically remote from each other, but they could be situated on the same premises if desired.

For ease of illustration, the construction and modular assembly of the stations in teleconferencing system 10 will be described in relation to the first station 12. As shown in the sectional top view of FIG. 2, the first station 12 is shown assembled or constructed into a generally elongated octagonal shape. The first station 12 comprises a plurality of modular members 32a–32h which include walls 32a, 32c–e, 32g–h, doors in wall members 32b and 32f and entry facade 32f-32l. The first station 12 also comprises a ceiling 34 (FIG. 1A) which is mounted on the members 32a–32h with suitable fasteners, such as nuts, bolts, adhesives, brackets, or any other suitable fastening means. Notice that the ceiling 34 has a dropped or sunken portion 34a which supports appropriate lighting fixtures 56.

In the embodiment being described, each of the members 32a–32h and the ceiling 34 is molded or formed to provide or define an environment having a unique architectural setting and/or sensory setting. For example, as illustrated in FIG. 1A, the wall member 32a may be formed to provide a plurality of stones 36, a plurality of columns 38, and an arch 40 to facilitate defining a first predetermined setting 12a having a Roman/Italian motif, theme or aura. One or more of the members 32a–32h may be provided with inlays, wall decorations (like picture 58 in FIGS. 1A and 2), or even a permanent frosted glass window and frame arrangement 42 mounted therein. Furthermore, members 32b and 32f (FIG. 2) may be provided with sliding doors 44 which facilitate entering and exiting the first station 12 and which are designed to complement or further enhance the Roman/Italian motif.

In the embodiment being described, notice that member 32h (FIGS. 1A and 2) is formed to provide a stone and pillar appearance and texture complementary to the stone and pillar appearance and texture of the wall members, such as member 32a. Also, the member 32a may be shaped to frame or mask a rear projection screen 46, as shown. The function and operation of the rear projection screen 46 will be described later herein. In the embodiment being described, the rear projection screen 46 comprises a high resolution lenticular rear projection screen which is either integral with or mounted directly to member 32h to provide a first video area 20 having a usable projection area of about 52 inches by 92 inches with an associated aspect ratio of 16:9.

Each of the members 32a–32h and ceiling 34 are created in separate modular units using a plurality of molds (not shown). In the embodiment being described, a suitable material for molding the members 32a–32h and ceiling 34 to provide a granite-like appearance may be Gypsum, but they could be formed from other suitable material such as stone or clay-based materials, ceramic, paper, cardboard, foam, wood, Styrofoam and the like. As illustrated in 1A and 2, the member 32d may be provided with a shelf or mantle 33. The various members 32a–32h are assembled together as shown in FIG. 2 and secured together with suitable support braces 48 which may be secured to the walls 32a–32h with any suitable fastener such as screws, bolts, an adhesive or the like. After the first station 12 is assembled and the ceiling 34 is secured thereto, it has a length of about 14 feet, 6 inches (indicated by double arrow L in FIG. 2) and a width of about 12 feet, 0 inches (indicated by double arrow W in FIG. 2). The first station 12 has an approximate height from floor to ceiling 34 of about 8 feet, 6 inches. Further, the members 32a, 32c, 32e and 32g have a width (indicated by double arrow Y in FIG. 2) of about 5 feet, 0 inch. Finally, the back wall member 32d and front wall member 32h comprises a width of about 7 feet, 8 inches (indicated by double arrow X in FIG. 2).

After the members 32a–32h and ceiling 34 are assembled, the first station 12 may be further decorated, designed or ornamented with a plurality of subjects, decorations or ornaments which facilitate providing the first predetermined sensory setting 12a which defines a first aura, motif or theme. Likewise, the second station 14 may be further provided or ornamented with a plurality of subjects, decorations or ornaments which facilitate providing a second predetermined sensory setting 14a which defines a second aura, motif or theme. For example, as illustrated in FIG. 1A, the predetermined sensory setting 12a of the first station 12 may be further decorated with a table 50, table decorations, pillar and wall decorations, carpet (not shown), plants 54 and other wall decorations (not shown) to further enhance the Roman/Italian motif, theme or aura. The first and second predetermined sensory settings 12a and 14a may also comprise appropriate lighting fixtures 56 and appropriate furnishings, such as chairs 60 and tables 61, which complement the predetermined setting to further facilitate defining the Roman/Italian theme or motif for the stations 12 and 14.

It should be appreciated that once the first and second stations 12 and 14 are assembled and ornamented or decorated to provide their respective first and second predetermined sensory settings 12a and 14a, they define an aura, theme or motif which facilitates providing or creating a very sensual and impressionable environment. Providing such a station, such as station 12, with a strong sensory environment facilitates enhancing the virtual presence illusion created by teleconferencing system 10 of the present invention.

It should also be appreciated, however, that although the first station 12 and second station 14 are shown in the embodiment in FIGS. 1A and 1B as having complementary or similar first and second predetermined sensory settings 12a and 14a, they could be provided with first and second predetermined sensory settings 12a and 14a having different themes, motifs or auras. Thus, while the embodiment described in relation to FIGS. 1A and 1B illustrate a first and second set of stations 12 and 14 having a Roman/Italian motif, another set of stations, such as station 12' and station 14' in the embodiment illustrated in FIGS. 3A and 3B, may have at least one station having a different predetermined setting. For example, the second station 14' in FIG. 3B provides a setting 14a' which defines a Chinese aura, theme or motif.

It should also be appreciated that the members 32a–32h, ceiling 34 and associated predetermined sensory setting are provided to be transportable and capable of being assembled at any suitable location, such as an existing rectangular room, suite or conference area having dimensions of at least 20 feet×20 feet×9 feet. While it may be desirable to provide the first and second stations 12 and 14 in the teleconferencing system 10 with substantially the same dimensions, it should be appreciated that they could be provided with differing dimensions, depending on, for example, the number of participants at each station. It should also be appreciated that the second station 14 and other stations described herein would preferably be manufactured and assembled in the same or similar manner as the first station 12. Also, the stations in the teleconference system 10 may be decorated with wall, ceiling and floor coverings to provide, for example, the first predetermined sensory setting 12a without using the pre-formed or molded modular members 32a–32h described above, although the use of such members may be preferable in this embodiment.

The teleconferencing system 10 also comprises conferencing means or a conferencing system means for teleconnecting the first and second stations 12 and 14 together to facilitate capturing an image or images at one of said stations and displaying at least a portion of the image or a sub-image at another of the stations such that it becomes generally visually integrated with the predetermined sensory setting at that station, thereby facilitating creating a "video mirror" and a "face-to-face" environment for the participant situated at that station. As shown in FIG. 1A, the conferencing system associated with the first station 12 comprises image sensor means, imager or image sensors for sensing images at the first station 12. For the embodiment shown in FIGS. 1A and 2, the image sensor means comprises a plurality of cameras which are operably associated with the rear projection screen 46 of first station 12. In this regard, the plurality of cameras comprise a first camera head 62 and second camera head 64 which are operatively coupled to a first camera control unit 66 and second camera control unit 68, respectively. Notice that the first and second camera control units 66 and 68 are remotely situated from the first and second camera heads 62 and 64. This facilitates permitting the first and second cameras 62 and 64 to be placed directly in the projection path of the rear projection screen 46, without substantially interfering with the video image being projected.

In the embodiment being described, the first camera head 62 and second camera head 64 are situated approximately 16 inches above the surface of table 50 which generally corresponds to the eye level of the seated participants situated at table 50. As illustrated in FIG. 2, the first and second cameras 62 and 64 are situated behind the rear projection screen 46 in operative relationship with a pair of 1¼ inch diameter openings 66 and 68, respectively. The first and second cameras 62 and 64 are mounted on a suitable narrow or non-interfering bracket (not shown) such that they can be positioned behind the rear projection screen 46 in operative relationship with openings 66 and 68, respectively. In the embodiment being described, the first and second cameras 62 and 64 are 1¼ inch by 1¼ inch 3-CCD camera heads which generate images having an aspect ratio of about 3:4 and a picture resolution of about 494×700 pixels. One suitable 3-CCD camera heads 62 and 64 and associated camera control units 66 and 68 may be Model No. GP-US502 manufactured by Panasonic Broadcast and Television Systems Company of Japan. It should be appreciated that while the teleconferencing system 10 shown and described in relation to FIGS. 1A and 1B show image sensor means comprising a plurality of camera heads 62 and 64 and camera control units 66 and 68 situated at a station, a single camera may be used (as shown and described relative to the embodiment shown in FIGS., 4A and 4B) or even multiple cameras could be used depending on such things as the size of the station, the number of participants situated at the station, and/or the aspect ratio of each camera head selected. It should also be appreciated that the camera heads 62 and 64 and associated camera control units 66 and 68 are configured and positioned at the first station 12 to facilitate providing maximum vertical eye contact among participates in the teleconference, while minimally interrupting the substantially life-size video projection on the rear projection screen 46.

The conferencing means also comprises a first differentiator or differential key generator 70 (FIG. 1A) and a second differentiator or differential key generator 72, respectively. The camera control unit 66 generates an RGB analog signal I-62 which is received by the first differentiator 70, and the camera control unit 68 generates an RGB signal I-64 which is received by the second differentiator 72. The first and second differentiators 70 and 72 provide means for processing the image signals generated by the camera control units 66 and 68 to remove or differentiate any undesired portion of the images corresponding to the signals I-62 and I-64. For example, as described in detail later herein, it is desired in this embodiment to separate the image of the participants situated at the first station 12 from at least a portion of the first predetermined sensory setting 12a, such as the background behind the participants, in order to provide a differential signal VS-1 that has that portion of the first predetermined sensory setting 12A removed. This, in turn, facilitates transmitting the video image of the participants at the first station 12 to the remote second station 14 and also facilitates compositing the image with other images, as described below.

Suitable differentiators 70 and 72 may comprise the differential key generator shown and described in U.S. Pat. No. 4,800,432, issued on Jan. 24, 1989 to Barnett et al. and assigned to The Grass Valley Group, Inc., which is incorporated herein by reference and made a part hereof.

The differential key generators 70 and 72 convert the I-62 and I-64 signals from RGB analog signals to digital image signals having corresponding images 104 and 106 (FIG. 5A), respectively. The differential key generators 70 and 72 compare the digital image signals to an associated differential reference signals DRS-62 and DRS-64, respectively, which generally corresponds to images 108 and 110 in FIG. 5A. As described in detail later herein, these images 108 and 110 comprise at least a portion of the first predetermined sensory setting 12a such as the background. The differential reference signals DRS-62 and DRS-64 are stored in appropriate storage 74 and 76 (FIG. 1A) associated with the differential key generators 70, 72, respectively. In the embodiment being described, the differential reference signals DRS-62 and DRS-64 comprise a reference frame of a video image grabbed by one or both cameras 62 or 64 situated at the first station 12 from a video sequence of the first predetermined sensory setting 12a of the first station 12 background where no participants, chairs, or other foreground elements are in place.

In response to the comparison, the first and second differentiators 70 and 72 generate differentiated video signals VS-1 and VS-2 (FIG. 1A), respectively. As illustrated in FIG. 5, the VS-1 and VS-2 signals generally correspond to the individuals situated at the first station 12 when viewed in the direction of arrow A in FIG. 2. As illustrated in the images 112 and 114 (FIG. 5) associated with the VS-1 and VS-2 signals, respectively, notice that the background area shown in images 104 and 106 has been removed and is tagged as a "zero" image area.

Advantageously, tagging at least a portion of the image represented by the VS-1 signal as "zero" background facilitates compressing the VS-1 and VS-2 signals and providing corresponding compressed CDS-1 and CDS-2 signals, thereby reducing the amount of transmission band width needed. This tagging also facilitates compositing or overlaying another predetermined image to provide a seamless composited image as described in detail below.

The video signals VS-1 and VS-2 are received by a first compression/decompression means or CODEC 78 and a second compression/decompression means or CODEC 80, respectively. The CODECs 78 and 80 also receive an audio signal AS-A1 and AS-A2 from suitable microphones 82 and 83, respectively, which may be positioned or concealed at an appropriate location in the first station 12, such as underneath or on top of table 50, as illustrated in FIG. 1A. The function of the first and second CODEC 78 and 80 is to compress video and audio signals for transmitting to remote stations, such as the second station 14, and also to decompress compressed video and audio signals received from remote stations. Consequently, the CODECs 78 and 80 are configured with suitable compression and decompression algorithms which are known to those of ordinary skill in the art. The CODEC Model No. Rembrandt II VP available from Compression Labs, Inc. of San Jose, Calif. is suitable for use in the embodiment described herein, but it should be noted that other suitable compression/decompression means may be employed.

The CODEC 78 receives the video signal VS-1 and audio signal AS-A1, and CODEC 80 receives the video signal VS-2 and audio signal AS-A2. The CODECs 78 and 80, generate digital signals CDS-1 and CDS-2, respectively, in response thereto which are in turn transmitted to remote station 14 via a transmission network 84.

The transmission network 84 may be configured as a private network, public circuit switch service, and it may utilize telecommunication and/or satellite technology. In the embodiment being described, the transmission network 84 preferably includes a plurality of T-1 lines (not shown) which are capable of accommodating bit streams having a suitable band width, such as 1.544 megabytes per second.

The teleconferencing system 10 and conference means associated with the first station 12 also comprises enhancing means for enhancing the resolution of an image or sub-image received from a remote station, such as the second station 14. In the embodiment being described, enhancing means comprises a first line doubler 86 and a second line doubler 88 which are operatively coupled to the first CODEC 78 and second CODEC 80, respectively. In this embodiment, the first and second line doublers 86 and 88 enhance the resolution and picture quality of at least a portion of the image corresponding to video signals VS-3 and VS-4 received from the CODECs 78 and 80, respectively, by about 50–150%. The VS-3 and VS-4 signals correspond to images or sub-images received from remote station(s), such as station 14, as described in detail below. One suitable line doubler is the Model No. LD 100 available from Faroudja Laboratories, Inc. of Sunnyvale, Calif., but other suitable enhancing means may be provided to provide greater or less enhancement of the images to be displayed. For example, lenses, mirrors, optical pixel interpolation or other electrical means may be employed as desired. It should also be noted that the present invention may be performed without the use of any enhancing means without departing from the scope of the invention.

The first and second line doublers 86 and 88 generate enhanced video signals which are input into compositing means, compositor or video compositing multiplexer 92 for compositing the enhanced video signals associated with the images or sub-images received from the remote station(s) with one or more predetermined composite signals, such as predetermined composite signal A, corresponding to a predetermined composite image or sub-image which are stored in a suitable storage device 94 associated with the compositor 92. In the embodiment being described, the predetermined composite signal A corresponds to an image of at least a portion of first predetermined sensory setting 12a, such as the background of the first station 12. The video compositing multiplexer 92 composites the signals received from the first and second line doublers 86 and 88 with the predetermined composite signal A and generates a RGB analog composite signal in response thereto. It has been found that Model No. E-Space-1 available from Miranda Technologies, Inc. of Montreal and Quebec, Canada, is one suitable video compositing multiplexer 92.

The teleconferencing system 10 comprises a projector 96 coupled to the video compositing multiplexer 92 which receives the RGB composite signal and projects a corresponding image 90 (FIG. 1A) corresponding to the composite signal on the rear projection screen 46. The Model No. 3300 available from AMPRO Corporation of Titusville, Fla. has been found to be a suitable projector 96. Although the embodiment has been described using projector 96 and rear projection screen 46, other suitable means may be employed for projecting or displaying the composited image. For example, a liquid crystal display (LCD) or other electronic screen may be suitable to display images at a station. This may eliminate the need for the projector 96.

The projector 96 could be used with an optical system or a plurality of mirrors (not shown), or prisms (not shown) such that the projector can be positioned, for example, to the side or below the rear projection screen 46 or in a manner that permits the projector 96 to project the image towards a mirror (not shown), which causes the image to be projected on the rear projection screen 46.

As described in detail below, the composite signal and its corresponding image 90 generally comprise a video image of at least a portion of the first predetermined sensory setting 12a combined or composited with a differentiated image, such as an image of the participants from the second station 14 which correspond to the VS-3 and VS-4 (FIG. 1B) signals. Consequently, the resultant image 90 projected on screen 46 at the first station 12 complements or blends with the architectural motif, aura, theme or design defined by the first predetermined sensory setting 12a at the first station 12, such that the projected image 90 appears visually integrated with the first predetermined sensory setting 12a of the first station 12. This, in turn, causes any image of the participants situated at the second station 14 and included in the image 90 to appear to be face-to-face with participants at the first station 12 during the teleconference. The operation of the compositor 92 is described in more detail later herein.

It should be appreciated that the sub-images or images received from the remote station(s) typically have a resolution on the order of about 352×288 pixels and the predetermined composite signal A comprises a resolution on the order of about 1280×1024 pixels. Thus, the resultant composite image 90 may comprise, for example, an image of the participants situated at the second station 14 having a first resolution and a background image of the first station 12 having a second resolution, which is higher than the first resolution. This enables compositor 92 to provide a composite image 90 which, when displayed on screen 46, gives the illusion or effect of a "video mirror" to the participants situated at the first station 12.

The teleconferencing system 10 also includes audio means comprising a plurality of speakers 100 and 102

(FIGS. 1A and 2) which, in turn, receive audio signals AS-B1 and AS-B2 from CODECs 78 and 80, respectively. It should be appreciated that the audio signal AS-B1 and AS-B2 generally correspond to the audio associated with the sound (e.g., voices, music and the like) associated with the remote station(s), such as second station 14.

It should also be appreciated that the rear projection screen 46 and projector 96 are configured and selected to enable the teleconferencing system 10 to project the composited image 90 (FIG. 1A) at a predetermined scale, such as substantially full scale. In this regard, the compositor 92 comprises a scaler 95 which is integral therewith for scaling the composited signal associated with the composited image 90 to a desired or predetermined scale, such as substantially full scale.

Referring now to FIG. 1B, the second station 14 comprises similar components as the first station and such like components are labelled with the same reference numeral as their corresponding component in the first station 12, except that the components associated with the second station 14 have a "-1" designator added thereto. Such components operate and function in substantially the same manner as described above with regard to the first station 12 with the following being some differences. The differential reference signals DRS-3 and DRS-4 (FIG. 5) associated with the second station 14 generally correspond to an image or sub-image of at least a portion of the second predetermined sensory setting 14a, such as the background 98-1, of the second station 14. Such sub-image or image may include at least a portion of the background 98-1 without any participants, chairs or other foreground subjects situated in the second station 14. Also, like the predetermined composite signal A stored in the storage 94 associated with the first station 10, a predetermined composite signal B may be stored in the storage 94-1 associated with the compositor 92-1 second station 14. The predetermined composite signal B may correspond to an image or sub-image of at least a portion of the second predetermined sensory setting 14a of the second station 14. Such sub-image or image may include, for example, an image of the walls 32a-1 to 32h-1 and conference area 18 or background of the second station 14. Notice that in the embodiment shown in FIGS. 1A and 1B, the second station 14 has a second predetermined sensory setting 14a which mirrors or is complementary to the first predetermined sensory setting 12a. As described above, however, the first and second predetermined sensory settings 12a and 14a may be different.

A method of operating the teleconferencing system 10 will now be described in relation to FIGS. 6A–6D. The modular components, such as members 32a to 32h and ceiling 34 for first station 10, decorations and the like, are configured, assembled and decorated (block 99 in FIG. 6A) at a desired location to provide a conference station comprising a predetermined sensory setting defining a predetermined theme, motif or aura. As mentioned earlier herein, the theme, motif or aura may be complementary (as shown in FIGS. 1A and 1B) or they can be completely different, as shown in FIGS. 3A and 3B (described below). For ease of illustration, it will be assumed that the stations are assembled and decorated as shown and described relative to the embodiment in FIGS. 1A and 1B.

Once the modular stations 12 and 14 are assembled and decorated, it may be desired (decision point 101 in FIG. 6A) to use differentiator (e.g., differentiator 72 in FIG. 1A). As discussed herein relative to the embodiments shown in FIGS. 4A and 4B, it may not always be desired to generate a differential reference image, thereby making it unnecessary to generate the differential reference signal. If differentiation is desired, then the camera heads 62 or 64 generate at least one video image (block 103) of at least a portion of the first predetermined sensory setting 12A at the first station 12. The differentiators 72 and 74 grab or capture at least one differential reference image or sub-image from those images and generate (block 107) the differential reference signals DRS-62 and DRS-64, respectively. These signals are stored in suitable storage 74 and 76 for use by the differentiators 70 and 72, respectively. Likewise, cameras 62-1 and 64-1 at the second station 14 generate video images of at least a portion of the second predetermined setting 14a at the second station 14. The differentiators 70-1 and 72-1 grab or capture at least one differential reference image or sub-image from those images and generate differential reference signals (not shown) corresponding thereto. These signals are then stored (block 109) in suitable storage 74-1 and 76-1 for use by differential key generators 70-1 and 72-1, respectively.

As mentioned above, it is preferred that the differential reference signals DRS-62 and DRS-64 comprise an image of at least a portion of the first predetermined sensory setting 12a, such as an image of the first station 12 without any participants, chairs or other subjects which are not stationary during the teleconference. Likewise, it is preferred that the differential reference signals associated with the differentiators 70-1 and 72-1 comprise at least a portion of the second predetermined sensory setting 14a at the second station 14, such as an image of the background 98-1 without the participants, chairs and other subjects which are not stationary during the teleconference.

If differentiation of signals is not selected or at the end of the differentiation process, it may be desired to generate a composite image (decision point 97) for one or more of the stations. As discussed below, however, this may not always be required to achieve certain advantages of the invention. Such predetermined composite image would preferably include a substantial portion of the first predetermined sensory setting 12a, including the background and/or conference area 16 of the first station 12. If compositing is desired, then the predetermined composite signal A is generated (block 111 in FIG. 6B). The corresponding predetermined composite signal A may then be stored in suitable storage 94. In the same manner, the predetermined composite image at the second station 14 and corresponding predetermined composite signal B may be generated and stored as predetermined composite signal B in suitable storage 94-1. In the embodiment being described, the predetermined composite image associated with the second station 14 includes an image of at least a portion of the second predetermined sensory setting 14a, including the background 98-1.

In the embodiment being described, the predetermined composite signals A and B are generated by a suitable still camera (not shown) to provide a still image (not shown) of the station 12 or 14 being photographed. The still image would subsequently be scanned and digitized for storage by a suitable scanner (not shown). The still camera and scanner would preferably be capable of generating images having a resolution on the order of about 1280×1024 pixels. Thus, if compositing is performed, the resultant composite image (such as image 90 in FIG. 1A) may comprise an image having a high resolution background, for example, combined with a comparatively lower resolution image of the remote station participants. This, in turn, facilitates enhancing the "video mirror" effect wherein a mimic or replication of a common architectural technique of mirroring a wall of a given room which makes the overall room appear to be extended beyond its actual wall line.

Once the stations 12 and 14 are configured and the differential reference signals and predetermined composite signals A and B are generated and stored, the first and second suites 12 and 14 may then be teleconnected (block 113) or connected by satellite or other suitable means via the transmission network 84.

Next, one or more participants may be situated at the first and second stations 12 and 14. As illustrated in FIG. 2, notice that the participants seated at the first station 12 are situated a predetermined distance B from a participant's side 46a of the rear projection screen 46. The predetermined distance B generally corresponds to a preferred or optimum focal distance at which optimum imaging by cameras 62 and 64 may be performed. In the embodiment being described, it has been found that the predetermined distance should be about 5 feet, 6 inches. The participants are situated at the second station 14 in a similar manner and the face-to-face teleconference may then begin.

For ease of illustration, the imaging and display of first station 12 participants at the second station 14 will be described. The first and second cameras 62 and 64 capture (block 117 in FIG. 6B) live images of the participants situated at the first station 12 and generate corresponding RGB analog signals I-62 and I-64 which are received by the differential key generators 70 and 72, respectively. If differentiation was selected (decision point 147 in FIG. 6C), processing continues at block 119 otherwise it proceeds at block 123. The differential key generators 70 and 72 generate (block 121 in FIG. 6C) the digital differential signal VS-1 and VS-2, respectively, after comparing (block 119 in FIG. 6C) the I-62 and I-64 signals received from cameras 62 and 64 to their respective differential reference signals DRS 62 and DRS-64 which are received from storages 74 and 76.

The differential signals VS-1 and VS-2 are then received by CODECs 78 and 80 which also receive the audio signals AS-A1 and AS-A2 which correspond to the audio, including sounds, music and voices, associated with the first station 12. The CODECs 78 and 80 digitize the audio signals AS-A1 and AS-A2, combine the audio signals with their respective video signal VS-1 or VS-2, and generate (block 123) the compressed CDS-1 and CDS-2 signals in response thereto. The CDS-1 and CDS-2 signals are then transmitted (block 125) to the second station 14 via the transmission network 84 (FIG. 1B).

The CDS-1 and CDS-2 signals are received and decompressed (block 127 in FIG. 6C) by CODECs 78-1 and 80-1, respectively, associated with the second station 14 to provide decompressed VS-1 and VS-2 signals. The CODECs 78-1 and 80-1 also decompress the audio signals AS-A1 and AS-A2 received from the first station 10 which are transmitted to speakers 100-1 and 102-1, respectively, at the second station 14.

Substantially simultaneously with the broadcasting of the audio signals at the second station 14, CODECs 78-1 and 80-1 decompress the CDS-1 and CDS-2 signals to provide VS-1 and VS-2 signals. The decompressed video signals VS-1 and VS-2 are then received by line doublers 86-1 and 88-1. If it is desired to enhance the signals (decision point 129), then the line doublers 86-1 and 88-1 process or manipulate the signals (block 131) in order to enhance the resolution of the image corresponding to those signals. After the signals VS-1 and VS-2 are processed, it may be desired to composite (decision point 133 in FIG. 6D) those signals with one or more other signals. In this illustration, for example, the video compositor 92-1 composites images (block 135) corresponding to those signals with at least one predetermined composite image, such as image 122 (FIG. 5B) corresponding to the predetermined composite signal B provided from storage 94-1 (FIG. 1B) to provide a composite signal. As mentioned above, the composite signal generally corresponds to the composited image 91-1 to be displayed on the rear projection screen 46-1 at the second station 14.

The compositor 92-1 may (decision point 137, block 139 in FIG. 6D) scale the composited image to a desired scale, such as full scale, using scaler 95-1. Thereafter, the compositor 95-1 transmits a corresponding RGB analog signal to projector 96-1 which displays (block 141) the scaled, composited image on the rear projection screen 46-1 (FIG. 1B).

The teleconference may then be continued or terminated as desired (decision point 143, block 145).

Because the composited image is substantially full scale when projected and includes a high resolution image of at least a portion of the second predetermined sensory setting 14a, the image appears to blend or become visually integrated with the second predetermined sensory setting 14a. This, in turn, gives the participants situated at the second station 14 the perception that the first station participants are present or face-to-face with them in the second station 14.

In the same or similar manner, images and signals relative to the second station 14 images are captured, processed and displayed at the first station 12. So that images of the participants at the second station 14 are displayed at the first station 12 such that they appear to have a face-to-face presence at the first station 12. Thus, images of the second station 14 participants may be differentiated and composited such that, when they are displayed at the first station 12, the image completes or provides "the other half" of the first station 12 and becomes generally visually integrated therewith. Although not required, it may be desirable to enhance the face-to-face presence by providing, for example, first and second predetermined sensory settings 12a and 14a which define a dining environment wherein food or meals may be served. For example, the face-to-face presence may be further enhanced if the participants at both stations 12 and 14 order food and drinks from identical menus. Also, trained matître-de and/or waiters may be used to actively promote the perception of a face-to-face dinner using a scripted dialog and interaction with remote participants, maître-de and/or waiters.

Once the teleconferencing is terminated, the stations 12 and 14 may be used by the same or different participants without the need to reconstruct or re-assemble the stations.

FIGS. 5A and 5B provide a visual illustration of the images corresponding to some of the signals described above utilizing the method and embodiment described above. In this regard, images 104 and 106 generally correspond to the actual images captured by the first and second cameras 62 and 64, respectively. As described above, associated image signals I-62 and I-64 are transmitted to the differential key generators 70 and 72, respectively. The differential key generators 70 and 72 compare the images 104 and 106 to the images 108 and 110 associated with the differential reference signals DRS-62 and DRS-64 which are received from storages 74 and 76, respectively, and which were previously generated by cameras 62 and 64 from an identical fixed camera position.

As illustrated in FIG. 5A, the differential key generators 70 and 72 generate differential signals VS-1 and VS-2 which have corresponding images 112 and 114. Notice that these images 112 and 114 comprise an image of the participants which are situated at the first station 12 with the background area having been removed or tagged as a "zero" area. As described herein, this "zero" area becomes "filled-in" with the desired or predetermined composite image which may include, for example, an image of at least a portion of the predetermined setting or background of the second station 14. It has been found that removing a portion of the image, such as the background, by tagging it as zero, in the manner described herein, facilitates compressing the signals VS-1 and VS-2 and reducing the amount of bandwidth needed to transmit the images over transmission network 84 and between the first and second stations 12 and 14.

As mentioned above, the video signals VS-1 and VS-2 are fed into CODECs 78 and 80 which compresses the signals along with audio signal AS-A1 and AS-A2 and generates signals CDS-1 and CDS-2. The CDS-1 and CDS-2 signals are then transmitted, via transmission network 84, to the second station 14 and received by the CODECs 78-1 and 80-1 associated with the second station 14. As illustrated in FIG. 5B, the CODEC 78-1 and 80-1 decompresses the CDS-1 and CDS-2 signals, respectively, from the first station 12 and feeds them into associated line doublers 86-1 and 88-1. As mentioned earlier herein, the line doublers 86-1 and 88-1 facilitate enhancing the images associated with the video signals to provide enhanced video signals EVS-1 and EVS-2 (FIG. 5B), respectively.

As stated earlier, the enhanced video signals EVS-1 and EVS-2 are then received by the video compositing multiplexer 92-1 associated with the second station 14 wherein the signals are combined to provide an intermediate composite signal ICS having an associated intermediate composite signal image 120 having an aspect ratio of about 8:3.

The video compositing multiplexer 92-1 also receives the predetermined composite signal B having a predetermined composite signal B image 122 from storage 94-1. The video compositing multiplexer 92-1 composites or combines the images 120 and 122 to generate the composite signal having an associated or corresponding composite image 124 as shown in FIG. 5B. As stated earlier, the predetermined composite signal B image 122 generally corresponds to at least a portion of the predetermined setting or background of the second station 14 and has an aspect ratio of 16:9.

Notice that when the predetermined composite signal B image 122 is combined with the intermediate composite signal image 120, the video compositing multiplexer 92-1 causes the "zero" area of the intermediate composite signal image 120 to be "filled in" with the predetermined composite signal B image.

The composite image 124 may then be scaled to a predetermined size or scale, such as full scale, using scaler 94-1, so that the composite image 124 may be scaled to a substantially full scale or real-life size image as desired. The composite image signal corresponding to the composite image 124 is transmitted to the projector 96-1 and then displayed on the rear projection screen 46-1 at the second station 14. As illustrated in FIGS. 1B and 5B, the composite image 124 may be appropriately framed or masked (such as with an archway 125 in FIGS. 1B and 5B) when it is projected at the second station 14 to enhance the face-to-face, real time environment.

The audio and video signals transmitted between the first and second stations 12 and 14 may be, in this illustration, transmitted over separate T-1 lines (not shown) in the transmission network 84 in order to effect a substantially simultaneous and/or "real time" video conference. Thus, in the illustration shown in FIGS. 1A and 1B, the participants may be geographically remotely located, yet the participants situated at the first station 12 will feel as if the second station 14 participants are located face-to-face or present with them at the first station 12, while the participants situated at the second station 14 will feel as if the first station participants are face-to-face or present with them at the second station.

It should be appreciated that when the predetermined composite signal B and associated predetermined composite signal image 122 is composited with the intermediate composite signal and associated intermediate composite signal image 120, it overlays that signal to provide a seamless composite image 124, which facilitates reducing or eliminating the need to match up the borders or seams of the camera images with any high degree of accuracy. In this regard, it is preferable that cameras 62 and 64 and 62-1 and 64-1 preferably be situated such that they capture an entire participant rather than, for example, half of a participant. Thus, it may be desired to position the participants in a location such that any particular participants will not be in the field of view of more than one camera.

Advantageously, the invention provides an apparatus and method for providing a video mirror at each station 12 and 14 which facilitates creating a face-to-face and non-interrupted image of any participants in the video conference. Because the image of the participants is differentiated, less transmission bandwidth, computer memory and the like is required. Also, the differentiators and compositors of the present invention enable a user to create a composite image 124 (FIG. 5B) having at least a portion thereof imaged at a greater resolution than the portion which was transmitted over transmission network 84. This facilitates reducing the effect of limitations or transmission restrictions of the transmission network 84 which, in turn, facilitates increasing the quality of images displayed at a station.

In addition, notice that the composite image 124 (FIG. 5B) may have an aspect ratio which is different from the aspect ratio of the cameras 62 and 64. This enables the system and method of the present invention to utilize cameras which generate images having smaller or even larger aspect ratios. This also enables the system and method to use cameras having standard or common aspect ratios, such as 4:3.

FIGS. 3A and 3B, when taken together, illustrate another embodiment of the invention. The operation and components of the embodiment shown in FIGS. 3A and 3B are substantially the same as the operation of components of the embodiment described above relative to FIGS. 1A and 1B with the same reference numerals being used for the same components with the addition of single prime (') designator. Consequently this embodiment is similar to the embodiment shown in FIGS. 1A and 1B, except that the second predetermined setting 14a' in FIG. 3B and its associated theme, aura or motif is substantially different from the second predetermined setting 14a shown in FIG. 1B. In FIG. 3B, the first predetermined sensory setting 12a' comprises a plurality of decorations 120 defining the Chinese theme, motif or aura. Also, the predetermined composite signal A stored in storage 94-1' and the differential reference signals stored in storages 74-1' and 76-1 would generally correspond to an image of at least a portion of that setting 14a'.

As with the illustration described above relative to FIGS. 1A and 1B, the video and audio signals would be processed in substantially the same manner. In general, an image of the participants situated at the first station 12' is composited by compositor 92-1' with a predetermined composite image of at least a portion of the second predetermined sensory setting 14a' of the second station 14' and projected onto the rear projection screen 46-1' at the second station 14'. The first station 12' participants appear to be face-to-face with the second station 14' participants because they have a relatively high resolution video image behind them which complements or becomes integrated with the second predetermined sensory setting 14a'. Thus, as shown in FIG. 3B, the image 91-1' (FIG. 3B) of the ladies at the first station 12' includes a Chinese background which blends or complements the actual predetermined sensory setting 14a'.

Likewise, when the image of the participants situated at the second station 14' is projected on the rear projection screen 46' at the first station 12', they appear to be in the same room as the participants situated at the first station 12' because the Roman/Italian video background which is seen behind the second station 14' participants generally complements and becomes visually integrated with the actual Roman/Italian theme, motif or aura defined by the first predetermined sensory setting 12' of the first station 12'.

FIGS. 4A and 4B, when taken together, illustrate another embodiment of the invention. The components of the embodiment shown in FIGS. 4A and 4B which are substantially identical to the components in the embodiment shown in FIGS. 1A and 1B which have the same reference numerals with the addition of a double prime ("''") designators. As illustrated in FIGS. 4A and 4B, two remote modular stations such as stations 12" and 14" may be provided and designed to have first and second predetermined sensory settings 12a" and 14a" which are substantially identical. Thus, as shown in FIGS. 4A and 4B, images may be captured in the manner described above at station 12" received by CODECs 78" and 80" and then transmitted, via transmission 84", to associated CODECs 78-1" and 80-1", respectively. The CODECs 78-1" and 80-1" then generate a decompressed signal which may be enhanced by line doublers 86-1" and 88-1", respectively; scaled to an appropriate scale by scaler 95-1"; and then projected by projector 96-1" onto rear projection screen 46-1".

Notice that the image comprising the second station 14" participants and second predetermined sensory setting 14a" is displayed on screen 46" at the first station 12". Thus, this embodiment does not utilize the differentiating and compositing features of the previous embodiment, but may still achieve a face-to-face conference environment because the second predetermined sensory setting 14a" is configured to be identical to or complementary with the first predetermined sensory setting 12a". In this embodiment, entire images or sub-images of the stations 12 and 14 (including images of both participants and background) are displayed at remote station(s). Because the stations 12" and 14" are assembled, decorated and designed to be complementary or identical, they appear visually integrated to participants situated in the stations 12 and 14. Accordingly, the first and second predetermined sensory settings 12a" and 14a", including the background, are designed and arranged in a geometric fashion such that as cameras 62" and 64" capture images of the participants, they also capture images of the first and second predetermined sensory setting 12a" and 14a", respectively, at the most advantageous perspective for display at the remote station(s). As with prior embodiments, this causes the first station 12" participants to perceive that the second station 14" participants are situated or present with the first station 12" participants at the first station 14". Likewise, the first station 12" participants appear to be face-to-face with the second station 14" participants at the second station 14" when the images associated with the first station 12" are displayed on screen 46-1". Consequently, by providing complementary or identical first and second predetermined sensory settings 12a" and 14a", a face-to-face conference may be created. As with previous embodiments, it may also be desired to differentiate, enhance, composite or scale the images as described with previous embodiments, but this is not required with the embodiment being described.

Thus, it should be apparent that stations can be provided with predetermined settings which are completely different, yet, by utilizing the apparatus and method of the present invention, the images of the participants in these stations may be projected at remote stations so that they appear to be virtually face-to-face with the remote station participants at one or more remote stations.

Various changes or modifications in the invention described may occur to those skilled in the art without departing from the spirit or scope of the invention. For example, the screen 46 for station 12 has been shown as being integral with a portion of a wall 32h (FIGS. 1A and 2A), it could comprise a larger or smaller portion of that wall 32h, or it could be provided as part of one or more other walls, or even as part of the ceiling 34.

It should also be appreciated that while the embodiments have been shown and described comprising two stations, images from more than two remote stations may be displayed at a station, thereby permitting a teleconference convention among more than two stations.

Although not shown, one or more of the compositors, such as compositors 12 or 12-1 (FIG. 1A) may comprise a stationary or moving image database (not shown) for providing a plurality of predetermined composite signals which define a particular or desired video background. For example, participants may elect to use the arched background of their proximity, choose an event-related scene, or decide to meet in a setting completely unrelated to their site or station. For example, a station having a Manhattan eatery motif may be provided with a screen configured as a window (not shown). Certain moving video backgrounds of a busy New York avenue may be deposited and displayed on the screen to give the illusion that the participants situated at the station are dining in a popular Manhattan eatery.

It should also be appreciated that while the embodiments being shown and described herein refer to teleconferencing environments that have predetermined settings and motifs or auras relating to dining, the predetermined settings could define any type of aura, theme or motif which is suitable for video conferencing and in which it is desired to provide a "real-life" or face-to-face presence illusion. For example, the apparatus and method of this invention could be used in a business setting, education setting, seminar setting, home environment, religious setting, celebration setting (such as a birthday, retirement party, holiday or anniversary), or any other suitable setting as desired.

The above description of the invention is intended to be illustrative and not limiting, and is not intended that the invention be restricted thereto but that it be limited only by the spirit and scope of the appended claims.

What is claimed is:

1. A teleconferencing method comprising the steps of:
   capturing a plurality of images with at least one imager and generating image data in response thereto, wherein said plurality of images are of different fields of view;
   compressing said image data to provide compressed data;
   receiving said compressed data at a teleconferencing station;
   decompressing said compressed data to provide decompressed data;

enhancing said decompressed data to increase a resolution of at least one of said plurality of images; and displaying said plurality of images on at least one screen at said teleconferencing station using said decompressed data, wherein at least one of said plurality of images comprises a substanually life-size image of at least one person.

2. The teleconferencing method as recited in claim 1 wherein said method further comprises the step of:

decompressing said compressed data at said teleconferencing station prior to said displaying step.

3. The teleconferencing method as recited in claim 1 wherein said plurality of images are from separate remote stations, said method further comprises the step of:

capturing said plurality of images from a plurality of remote stations, respectively, prior to said displaying step.

4. The teleconferencing method as recited in claim 3 wherein said capturing step further comprises the steps of:

combining a first set of image data for a first image of at least one first person with a second set of image data corresponding to a second image of at least one second person to provide combined image data;

displaying a combined image corresponding to a said combined image data at said teleconferencing station; wherein said at least one first person and said at least one second person are both located at one of said plurality of remote stations.

5. The teleconferencing method as recited in claim 1 wherein said method further comprises the step of:

capturing said plurality of images at a plurality of remote locations, respectively.

6. The teleconferencing method as recited in claim 1 wherein said method further comprises the step of:

displaying said plurality of images on a rear-projection screen at said teleconferencing station.

7. The teleconferencing method as recited in claim 1 wherein said method further comprises the step of:

receiving said compressed data at a rate of at least 1.544 megabytes per second.

8. The teleconferencing method as recited in claim 1 wherein said method further comprises the steps of:

situating a plurality of subjects in said teleconferencing station to define a predetermined sensory setting.

9. The teleconferencing method as recited in claim 8 wherein said plurality of subjects include furniture and said predetermined sensing setting defines a business or education setting.

10. The teleconferencing method as recited in claim 1 wherein said method further comprises the step of:

selecting at least one said imager to have a resolution of about 494×700 pixels.

11. The teleconferencing method as recited in claim 1 wherein said at least one imager comprises a plurality of cameras, said method further comprises the step of:

capturing said plurality of images using said plurality of cameras, respectively.

12. The teleconferencing method as recited in claim 1 wherein said method further comprises the step of:

situating said imager at substantially eye level.

13. The teleconferencing method as recited in claim 11 wherein said method further comprises the step of:

situating said plurality of cameras at substantially eye level.

14. The teleconference method as recited in claim 11 wherein said plurality of images are captured through a plurality of openings in said at least one screen.

15. The teleconferencing method as recited in claim 1 wherein said at least one imager captures said plurality of images through at least one opening in said at least one screen.

16. The teleconferencing method as recited in claim 1 wherein said at least one imager comprises a CCD.

17. A teleconferencing method comprising the steps of:

capturing a plurality of images using an imager;

compressing data generated by said imager to provide compressed data;

transmitting said compressed data to a teleconferencing station;

enhancing said decompressed data to increase a resolution of said plurality of images to provide an enhanced plurality of images when they are displayed at said teleconferencing station; and displaying said enhanced plurality of images on at least one screen at said teleconferencing station so that at least one participant at said teleconferencing station views said enhanced plurality of images comprising an image of at least one person who appears substantially life size.

18. The teleconferencing method as recited in claim 17 wherein said method further comprises the step of:

decompressing said compressed data at said teleconferencing station prior to said displaying step.

19. The teleconferencing method as recited in claim 17 wherein said method further comprises the step of:

capturing said plurality of images from a plurality of stations prior to said displaying step.

20. The teleconferencing method as recited in claim 19 wherein said capturing step further comprises the steps of:

combining a first set of image data for a first image of at least one first person with a second set of image data corresponding to a second image of at least one second person to provide combined image data;

displaying a combined image corresponding to said combined image data at said teleconferencing station; wherein said first and second persons are both located at one of said plurality of remote stations.

21. The teleconferencing method as recited in claim 17 wherein said method further comprises the step of:

capturing said plurality of images at a plurality of remote locations, respectively.

22. The teleconferencing method as recited in claim 17 wherein said method further comprises the step of:

displaying said plurality of images on a rear-projection screen at said teleconferencing station.

23. The teleconferencing method as recited in claim 17 wherein said method further comprises the step of:

receiving said compressed data at said teleconferencing station at a rate of at least 1.544 megabytes per second.

24. The teleconferencing method as recited in claim 17 wherein said method further comprises the steps of:

situating a plurality of subjects in said teleconferencing station to define a predetermined sensory setting.

25. The teleconferencing method as recited in claim 24 wherein said plurality of subjects include furniture and said predetermined sensing setting defines a business or education setting.

26. The teleconferencing method as recited in claim 17 wherein said method further comprises the step of:

selecting said imager to have a resolution of about 494× 700 pixels.

27. The teleconferencing method as recited in claim 17 wherein said imager comprises a plurality of cameras, said method further comprises the step of:

capturing said plurality of images using said plurality of cameras, respectively.

28. The teleconferencing method as recited in claim 27 wherein said method further comprises the step of:

situating said plurality of cameras at substantially eye level.

29. The teleconferencing method as recited in claim 1 wherein said method further comprises the step of:

situating said imager at substantially eye level.

30. The teleconference method as recited in claim 17 wherein said plurality of images are captured through a plurality of openings, respectively, in said at least one screen.

31. The teleconferencing method as recited in claim 22, wherein said imager comprises a plurality of cameras that capture said plurality of images through a plurality of openings, respectively, in the at least one screen.

32. The teleconferencing method as recited in claim 17, wherein said cameras comprises a CCD.

33. A conferencing system comprising:

an imager for capturing a plurality of images in a plurality of different fields of view, respectively, and for generating image data corresponding to said plurality of images, when said plurality of images are transmitted to and displayed at said conferencing station, a substantially full scale image of a plurality of persons located at a remote conferencing station is displayed at said conferencing station;

a plurality of CODECs for compressing and decompressing image data transmitted between said conferencing station and said remote conferencing station; and an image data enhancer for enhancing image data received at said conferencing station after the image data is decompressed and during said teleconference in order to enhance the resolution of the substantially full scale image displayed at said conferencing station.

34. The conferencing system as recited in claim 33 wherein said conferencing system comprises:

a CODEC for receiving image data corresponding to said substantially full scale image;

said CODEC being capable of accommodating bit streams of at least 1.544 megabytes per second.

35. The conferencing system as recited in claim 33 wherein said substantially full scale image comprises a resolution of at least 352×288 pixels.

36. The conferencing system as recited in claim 33 wherein said substantially full scale image comprises a resolution of at least 1280×1024 pixels.

37. The conferencing system as recited in claim 33 wherein said conferencing system further comprises:

an analog signal generator for receiving bit streams from said CODEC and for generating an analog signal corresponding to said substantially full scale image.

38. The conferencing system as recited in claim 33 wherein said system further comprises:

a projector coupled to said analog signal generator for projecting said substantially full scale image in response to said analog signal.

39. The conferencing system as recited in claim 33 wherein said system further comprises a rear projection screen;

said projector projecting said substantially full scale image onto said rear projection screen.

40. The conferencing system as recited in claim 33 wherein said conferencing station defines an education setting.

41. The conferencing system as recited in claim 33 wherein said conferencing station defines a business setting.

42. The teleconferencing system as recited in claim 33 wherein said plurality of images are captured at a single remote location.

43. The teleconferencing system as recited in claim 33 wherein said system further comprises a rear-projection screen at said conferencing station on which the plurality of images may be displayed.

44. The teleconferencing system as recited in claim 33 wherein said imager comprises a plurality of cameras, said plurality of images being captured using said plurality of cameras, respectively.

45. The teleconferencing system as recited in claim 33 wherein said imager is situated at substantially eye level.

46. The teleconferencing system as recited in claim 45 wherein said plurality of images are captured through a plurality of openings in said at least one screen.

47. The teleconferencing system as recited in claim 33, wherein said imager captures said plurality of images through a single opening in said at least one screen.

48. The teleconferencing system as recited in claim 33, wherein said imager comprises a CCD.

49. The teleconferencing method as recited in claim 3 wherein said capturing step further comprises the steps of:

combining a first set of image data for a first image of at least one first person with a second set of image data corresponding to a second image of at least one second person to provide combined image data;

displaying a combined image corresponding to said combined image data at said teleconferencing station; wherein said at least one first person and said at least one second person are both located at one of said plurality of remote stations.

50. The teleconferencing system as recited in claim 33 wherein said plurality of images are captured at a plurality of remote locations.

* * * * *

UNITED STATES PATENT AND TRADEMARK OFFICE
CERTIFICATE OF CORRECTION

PATENT NO. : 6,654,045 B2
DATED : November 25, 2003
INVENTOR(S) : David L. Allen, and Herold Williams It is certified that error appears in the above-identified patent and that said Letters Patent is hereby corrected as shown below:

Column 19,
Line 60, after the word "said", please insert -- at least one --.

Column 20,
Line 12, please insert the paragraph -- decompressing said compressed data to provide decompressed data; --

Column 21,
Line 7, please delete the number "1"and insert -- 17 -- therefor.
Line 18, please delete the number "17" and insert -- 31 -- therefor.
Line 19, after the word "said",please insert -- plurality of --.
Line 25, please delete the word "said", and insert -- a -- therefor.

Column 22,
Line 1, please delete the number "33" and insert -- 37 -- therefor.
Line 6, please delete the number "33" and insert -- 38 -- therefor.

Signed and Sealed this

Eighteenth Day of May, 2004

JON W. DUDAS
*Acting Director of the United States Patent and Trademark Office*